US012762366B2

(12) United States Patent
Biasini et al.

(10) Patent No.: US 12,762,366 B2
(45) Date of Patent: Oct. 13, 2026

(54) SMART BARCODE DETECTION

(71) Applicant: Scandit AG, Zurich (CH)

(72) Inventors: Marco Biasini, Lucerne (CH); Andrea Gambini, Bologna (IT); Daniel Scherly, Zurich (CH); Flavio Zuffa, Bagnara di Romagna (IT)

(73) Assignee: Scandit AG, Zurich (CH)

( * ) Notice: Subject to any disclaimer, the term of this patent is extended or adjusted under 35 U.S.C. 154(b) by 0 days.

(21) Appl. No.: 19/065,614

(22) Filed: Feb. 27, 2025

(65) Prior Publication Data

US 2025/0272525 A1 Aug. 28, 2025

Related U.S. Application Data

(60) Provisional application No. 63/745,700, filed on Jan. 15, 2025, provisional application No. 63/558,261, filed on Feb. 27, 2024.

(51) Int. Cl.

| | |
|---|---|
| ***G06K 7/14*** | (2006.01) |
| ***G06T 7/20*** | (2017.01) |
| ***G06V 10/74*** | (2022.01) |
| ***H04N 5/265*** | (2006.01) |

(52) U.S. Cl.

CPC ......... *G06K 7/1443* (2013.01); *G06K 7/1447* (2013.01); *G06T 7/20* (2013.01); *G06V 10/761* (2022.01); *H04N 5/265* (2013.01)

(58) Field of Classification Search

CPC ... G06K 7/1443; G06K 7/1447; G06V 10/761

USPC ..................................................... 235/462.08

See application file for complete search history.

(56) References Cited

U.S. PATENT DOCUMENTS

| | | | | |
|---|---|---|---|---|
| 8,596,540 | B2 | 12/2013 | Adelmann | |
| 10,846,561 | B1 * | 11/2020 | Floerkemeier ....... | G06V 10/225 |
| 10,963,658 | B1 | 3/2021 | Bloch et al. | |
| 11,216,628 | B2 | 1/2022 | Scherly et al. | |
| 11,615,610 | B1 | 3/2023 | Floerkemeier et al. | |
| 11,880,738 | B1 | 1/2024 | Bloch et al. | |
| 11,922,271 | B1 | 3/2024 | Biasini et al. | |
| 12,079,673 | B2 | 9/2024 | Biasini et al. | |
| 12,488,473 | B1 | 12/2025 | Bloch et al. | |

(Continued)

OTHER PUBLICATIONS

Guo et al., "A Novel Image Thresholding Algorithm Based on Neutrosophic Similarity Score," Measurement, vol. 58, Dec. 2014, pp. 175-186.

(Continued)

*Primary Examiner* — Allyson N Trail

(74) *Attorney, Agent, or Firm* — Kilpatrick Townsend & Stockton LLP

(57) ABSTRACT

Smart barcode detection can include capturing, using a camera, a plurality of images of a real scene comprising a plurality of optical patterns. A score may be calculated for each of the plurality of images for comparing scores for each of the plurality of images to a threshold value. Based on the first image having a score that meets or exceeds the threshold value, detecting the first optical pattern and the second optical pattern in the first image and calculating an optical-pattern score for the first optical pattern in the first image. The first optical pattern may be decoded after detecting the plurality of optical patterns in the first image based on the optical-pattern score and without decoding the second optical pattern.

20 Claims, 10 Drawing Sheets

(56) References Cited

U.S. PATENT DOCUMENTS

| | | | | |
|---|---|---|---|---|
| 2002/0131641 | A1 | 9/2002 | Luo et al. | |
| 2007/0019864 | A1 | 1/2007 | Koyama et al. | |
| 2011/0085739 | A1 | 4/2011 | Zhang et al. | |
| 2016/0307006 | A1* | 10/2016 | Wang | G07C 9/257 |
| 2018/0196505 | A1* | 7/2018 | Nishizawa | G06F 3/013 |
| 2018/0373327 | A1* | 12/2018 | Todeschini | G06F 3/013 |
| 2019/0164001 | A1* | 5/2019 | Wan | G06F 9/4881 |
| 2019/0238692 | A1* | 8/2019 | Kai | H04N 1/00334 |
| 2020/0019743 | A1* | 1/2020 | Lei | G06K 7/1443 |
| 2021/0312217 | A1 | 10/2021 | Nater et al. | |
| 2023/0281887 | A1* | 9/2023 | Wesner | G06V 10/751<br>382/182 |
| 2023/0385578 | A1* | 11/2023 | Gurevich | G06K 7/10811 |
| 2025/0054164 | A1* | 2/2025 | Singh | G06T 7/162 |
| 2025/0272525 | A1* | 8/2025 | Biasini | G06K 7/1443 |

OTHER PUBLICATIONS

Application No. PCT/US2025/017584, International Search Report and Written Opinion, mailed on Apr. 21, 2025, 18 pages.

* cited by examiner

500

700

SMART BARCODE DETECTION

CROSS REFERENCE TO RELATED APPLICATIONS

This application claims the benefit of and priority to U.S. Provisional Application No. 63/558,261, filed on Feb. 27, 2024, and U.S. Provisional Application No. 63/745,700, filed on Jan. 15, 2025, each of which is hereby incorporated by reference in its entirety for all purposes.

BACKGROUND

This disclosure relates in general to a camera in a mobile device. More specifically, and without limitation, this disclosure relates to decoding barcodes in a scene or image using the camera in the mobile device. Barcodes have traditionally been scanned using a specialized scanner. For example, a barcode scanner comprising a laser is used to shine light on a barcode, and reflected light from the barcode is detected and used to decode the barcode. As mobile devices (e.g., smartphones and tablets) with cameras have become more common, mobile devices are being used to decode codes by acquiring an image of a code and using image analysis to decode the code. An example of a method for using as smartphone to decode a barcode is provided in U.S. Pat. No. 8,596,540, granted on Dec. 3, 2013.

BRIEF SUMMARY

This disclosure relates to code detection, and more specifically, and without limitation, to smart barcode detection.

In certain embodiments, an apparatus for smart barcode detection comprises a camera; a display; one or more processors; and one or more computer readable storage media storing instructions that, when executed by the one or more processors, cause the one or more processors to perform operations comprising: capturing, using the camera, a plurality of images of a real scene comprising a plurality of optical patterns, wherein the plurality of optical patterns comprises a first optical pattern and a second optical pattern; calculating a similarity score for each of the plurality of images; comparing similarity scores for each of the plurality of images to a threshold value; selecting a first image, from the plurality of images, based on the first image having a similarity score that meets or exceeds the threshold value; detecting the first optical pattern and the second optical pattern in the first image; calculating an optical-pattern score for the first optical pattern in the first image; decoding the first optical pattern, after detecting the plurality of optical patterns in the first image, based on the optical-pattern score and without decoding the second optical pattern, so that the first optical pattern is the only pattern of the plurality of optical patterns decoded in the first image; and presenting on the display a second image and a graphical overlay on the second image to indicate the first optical pattern is intended by a user of the system to be decoded.

In certain embodiments, the plurality of images is a first plurality of images; the threshold value is a first threshold value; and the operations further comprise: capturing a second plurality of images using the camera, after decoding the first optical pattern in the first image, wherein the second plurality of images comprise the first optical pattern; tracking the first optical pattern in the second plurality of images; presenting the second plurality of images on the display with the graphical overlay, without decoding the first optical pattern in the second plurality of images, based on tracking the first optical pattern in the second plurality of images; calculating similarity scores for each of the second plurality of images; comparing the similarity scores for each of the second plurality of images to a second threshold value; and not decoding the first optical pattern in the second plurality of images based on similarity scores for each of the plurality of images meeting or exceeding the second threshold value.

In certain embodiments, the optical-pattern score is based on a size of the first optical pattern in the first image or on a distance from a configurable point of the first image.

In certain embodiments, the threshold value is a first threshold value; and the operations further comprise: identifying a subset of images of the plurality of images having similarity scores that meet or exceed the first threshold value; calculating image scores for each image of the subset of images; comparing the image scores for each image of the subset of images to a second threshold value; and selecting the first image based on an image score of the first image meeting or exceeding the second threshold value.

In certain embodiments, a method for smart barcode detection comprises capturing, using a camera, a plurality of images of a real scene comprising a plurality of optical patterns, wherein the plurality of optical patterns comprises a first optical pattern and a second optical pattern; calculating a similarity score for each of the plurality of images; comparing similarity scores for each of the plurality of images to a threshold value; selecting a first image, from the plurality of images, based on the first image having a similarity score that meets or exceeds the threshold value; detecting the first optical pattern and the second optical pattern in the first image; calculating an optical-pattern score for the first optical pattern in the first image; decoding the first optical pattern, after detecting the plurality of optical patterns in the first image, based on the optical-pattern score and without decoding the second optical pattern; and presenting on a display a second image and a graphical overlay on the second image to indicate the first optical pattern is intended to be decoded.

In certain embodiments, the plurality of images is a first plurality of images; the threshold value is a first threshold value; and the method further comprises: capturing a second plurality of images using the camera, after decoding the first optical pattern in the first image, wherein the second plurality of images comprise the first optical pattern; calculating similarity scores for each of the second plurality of images; comparing the similarity scores for each of the second plurality of images to a second threshold value; and not decoding the first optical pattern in the second plurality of images based on the similarity scores for each of the plurality of images meeting or exceeding the second threshold value.

In certain embodiments, the second threshold value is the same as the first threshold value.

In certain embodiments, the method further comprising: tracking the first optical pattern in the second plurality of images; and presenting the second plurality of images on the display with the graphical overlay, without decoding the first optical pattern or other optical patterns in the second plurality of images.

In certain embodiments, the plurality of images is a first plurality of images; and the method further comprises: capturing a second plurality of images using the camera, after decoding the first optical pattern in the first image, wherein the second plurality of images comprise the first optical pattern; tracking the first optical pattern in the second plurality of images; and presenting the second plurality of images on the display with the graphical overlay, without decoding the first optical pattern in the second plurality of images, based on tracking the first optical pattern in the second plurality of images.

In certain embodiments, the plurality of images is a first plurality of images; and the method further comprises: capturing a second plurality of images using the camera, after decoding the first optical pattern in the first image, wherein the second plurality of images comprise the first optical pattern; tracking the first optical pattern in the second plurality of images; and presenting the second plurality of images on the display with the graphical overlay, without decoding the first optical pattern in the second plurality of images, based on tracking the first optical pattern in the second plurality of images.

In certain embodiments, the optical-pattern score is based on a size of the first optical pattern in the first image.

In certain embodiments, the optical-pattern score is based on a distance from a configurable point of the first image.

In certain embodiments, the method further comprising: calculating an optical-pattern score for the second optical pattern, based on how far the second optical pattern is from the configurable point of the first image; comparing the optical-pattern score of the first optical pattern to the optical-pattern score of the second optical pattern; ascertaining that the first optical pattern is closer to the configurable point of the first image than the second optical pattern based on comparing the optical-pattern score of the first optical pattern to the optical-pattern score of the second optical pattern; and decoding the first optical pattern and not the second optical pattern in the first image based on the first optical pattern being closer to the configurable point of the first image than the second optical pattern.

In certain embodiments, the threshold value is a first threshold value; and the method further comprises: identifying a subset of images of the plurality of images having similarity scores that meet or exceed the first threshold value; calculating image scores for each image of the subset of images; comparing the image scores for each image of the subset of images to a second threshold value; and selecting the first image based on an image score of the first image meeting or exceeding the second threshold value.

In certain embodiments, the second threshold value drops as more time passes without identifying an image of the subset of images having an image score that exceeds the second threshold value.

In certain embodiments, image score is based on how far an optical pattern of the plurality of optical patterns is from a center of an image, with a higher value for at least one optical pattern being closer to the center of the image.

In certain embodiments, the first optical pattern is in a group of optical patterns that are decoded.

In certain embodiments, the plurality of optical patterns comprises three or more optical patterns that are detected in the first image; and a the first optical pattern is the only pattern of the plurality of optical patterns decoded in the first image.

In certain embodiments, a memory device comprising instructions that, when one or more computer readable storage media storing instructions that, when executed by the one or more processors, cause the one or more processors to perform operations comprising: capturing, using a camera, a plurality of images of a real scene comprising a plurality of optical patterns, wherein the plurality of optical patterns comprises a first optical pattern and a second optical pattern; calculating a similarity score for each of the plurality of images; comparing similarity scores for each of the plurality of images to a threshold value; selecting a first image, from the plurality of images, based on the first image having a similarity score that meets or exceeds the threshold value; detecting the first optical pattern and the second optical pattern in the first image; calculating an optical-pattern score for the first optical pattern in the first image; decoding the first optical pattern, after detecting the plurality of optical patterns in the first image, based on the optical-pattern score and without decoding the second optical pattern; and presenting on a display a second image and a graphical overlay on the second image to indicate the first optical pattern is intended to be decoded.

In certain embodiments, the optical-pattern score is based on a distance from a configurable point of the first image.

In certain embodiments, the plurality of images is a first plurality of images; the threshold value is a first threshold value; and the operations further comprises: capturing a second plurality of images using the camera, after decoding the first optical pattern in the first image, wherein the second plurality of images comprise the first optical pattern; calculating similarity scores for each of the second plurality of images; comparing the similarity scores for each of the second plurality of images to a second threshold value; and not decoding the first optical pattern in the second plurality of images based on the similarity scores for each of the plurality of images meeting or exceeding the second threshold value.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
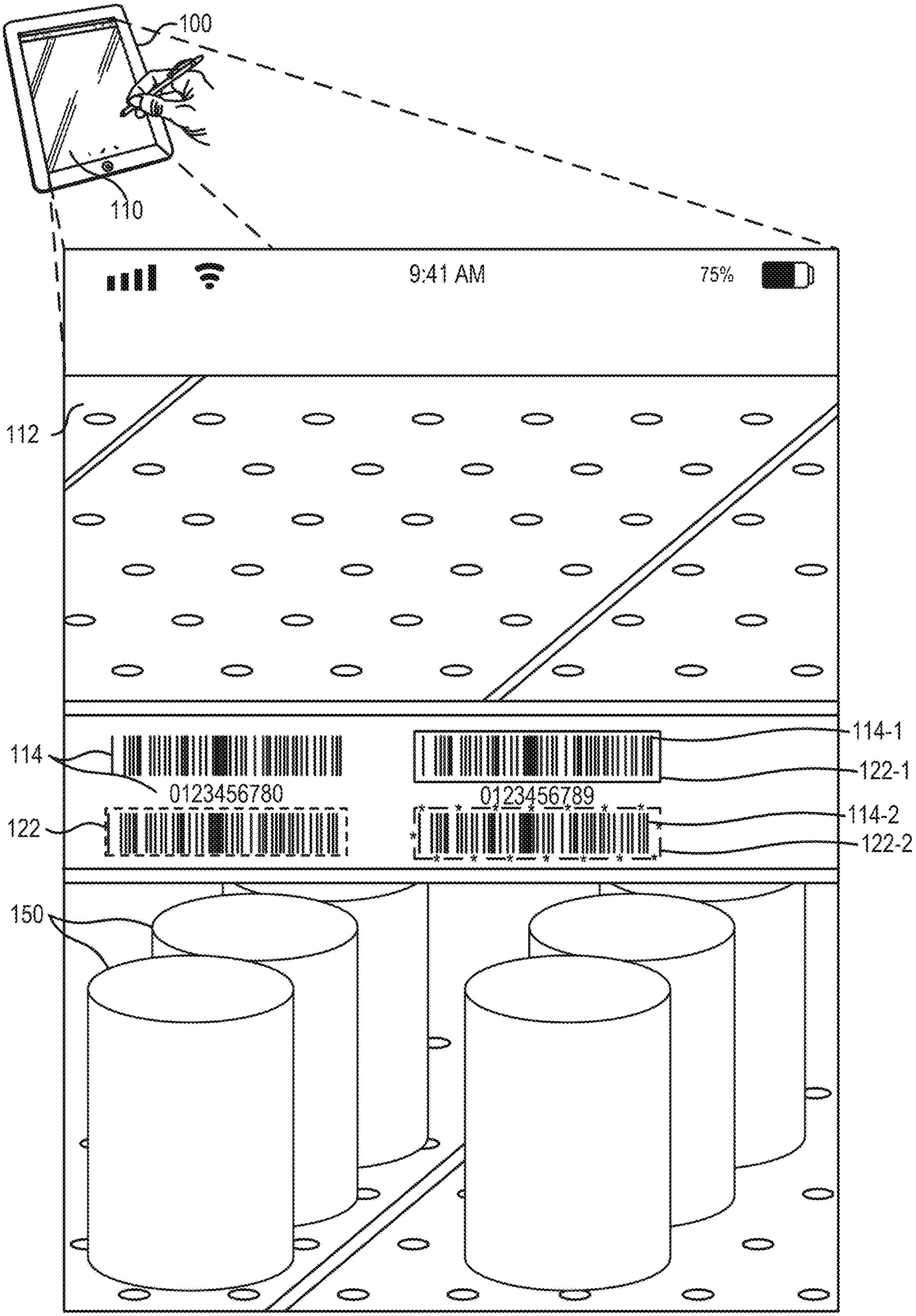
FIG. 1 depicts an example technique for automated recognition and decoding of a pattern in an image containing multiple patterns, according to some implementations of the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

INTRODUCTION

Smartphones and other camera equipped devices facilitate the decoding of barcodes in real scenes by capturing images of the real scenes and processing the images to decode the barcodes in the real scenes. Internal processing components such as image processors may use algorithms to decode the barcode into barcode data that is associated with a real scene object. For example, many objects within a retail store may have barcodes to facilitate tracking (e.g., stock taking), stocking, information transfer (e.g., object descriptions), and/or sales (e.g., self-checkout). Similar objects may have similar, or even identical, barcodes. For example, a store which stocks candles may have one hundred identical candles with identical barcodes to ensure that the candles are sold at the same price. A user with a smartphone may attempt to capture an image of one of the barcodes on the candles in order to retrieve information about the candle, however, the image may include multiple barcodes since products are typically compacted to reduce as much physical space as possible. In these instances, among others, some of the barcodes could be for different products which leads to the smartphone attempting to decode "the correct" barcode which the user is attempting to retrieve information about. This may lead to incorrect information being relayed to the user if the wrong barcode is selected for decoding. In addition, when the user is moving about and attempting to capture new images of new barcodes, the intervening movement of the smartphone may capture additional unintentional barcodes during movement which can unnecessarily drain battery power of the smartphone, provide unwanted information to the user, increase processing needs of the smartphones processor electronics due to unintentional barcode scanning, and increase data volumes stored in memory on the smartphone by capturing, storing, displaying images of the barcode.

To overcome the foregoing challenges and others, the present disclosure implements smart barcode detection techniques. By way of a non-limiting example, in scenarios where a user is using a device to read barcodes in quick succession (e.g., a barcode every second or so), the device may track motion of the device as the device moves from barcode to barcode with an expected single scan for each barcode. Due to potential duplicate barcodes (e.g., decoding barcodes yields the same results, even for different objects), motion between images (e.g., image frames) may be tracked in order to determine if the device has moved from a barcode previously decoded to a new barcode that has yet to be decoded. After the barcode is read, the device may mitigate and/or prevent additional scans until the device is determined to have moved and stopped again, signaling that the user is now moving to the next barcode. For example, when the user moves the device and stops for a second, the device may capture a new barcode. In some examples, after each barcode is read, a location (e.g., position in real space) may be tracked along subsequent images as long as the barcode is still present within a captured scene (e.g., a field of view of the device). Tracking the barcode may occur once the barcode has been decoded and may end once the barcode has exited the field of view of the device. Tracking may be used to prevent successive decoding of previously decoded barcodes. Tracking the location of the barcodes and detecting motion of the device may be used independently of one another or may be used in conjunction with each other to improve robustness of mitigating unintentional decoding of barcodes and/or only decoding each barcode a single time.

In addition, or alternatively, the device may identify an intended barcode using image scoring. For example, a device may capture a continuous stream of images (e.g., video) that may include barcodes. Each image of the stream may contain barcodes that may or may not be in focus or may be the intended barcode. Image scoring may be used to determine an intended barcode to be decoded using parameters related to, without limitation, a barcodes relative size (e.g., how big is the barcode in the field of view) or the position of the barcode in the field of view (e.g., how close is the barcode to the center of the field of view). The device may track scores for each image to determine which image contains the intended barcode. If the optical-pattern score or image score reaches a certain threshold, the device may determine the barcode as being an intended barcode to scan. In certain examples, the device may determine that a barcode is not being returned as the intended barcode due to a low image score even though the user has positioned the barcode in the field of view of the camera for a certain amount of time. In this example, the device may determine that the barcode, which has not been decoded before, is the intended barcode and perform a decoding operation.

In some configurations, the present disclosure improves the technical field of barcode scanning by detecting the motion of the device to determine when a user has started movement and stopped movement. For example, if the device has detected that the device has stopped, the device may determine that an intended barcode is to be decoded. Once movement is detected again, operations to detect a new intended barcode may be paused until the movement is determined to have stopped again. In certain configurations, the device may be stationary, and objects in the field of view of the device may be in motion. In these configurations, the device may determine when the object (or objects) have stopped moving relative to the device in order to decode the intended barcode. This may improve battery life of the device since decoding of barcodes may occur at the most likely instances rather than continuously decoding every barcode in a field of view. Additionally, since the device is not actively decoding barcodes while moving, the processing power may be reduced since the device may function to search for intended barcodes when the device has ceased moving (within a threshold).

Moreover, tracking locations of previously decoded barcodes to prevent additional scanning of the previously decoded barcodes and image scoring may both be used to "filter" out duplicates and/or prevent decoding of unintentional barcodes. For example, a scene may include dozens of barcodes that a user wants to decode, half of which have already been decoded by the device. In this example, half of the decoded barcodes may be tracked and determined to not need to be decoded again, which reduces processing power needed since only the remaining six barcodes will be decoded while the other previously decoded six barcodes will not be decoded again. Image scoring may be used to ensure that the barcode decoded is the intended barcode that the user would like decoded. By reducing the amount of barcodes that could potentially be decoded, image scoring reduces the processing power needed to decode the desired barcodes.

Examples of optical patterns include 1D barcodes, 2D barcodes, numbers, letters, and symbols. As scanning optical patterns is moved to mobile devices, there exists a need to increase scanning speed, increase accuracy, and/or manage processing power. Interpreting an optical pattern (e.g., scanning for an optical pattern) can be divided into two steps: detecting and decoding. In the detecting step, a position of an optical pattern within an image is identified and/or a boundary of the optical pattern is ascertained. In the decoding step, the optical pattern is decoded (e.g., to provide a character string, such as a numerical string, a letter string, or an alphanumerical string). As optical patterns, such as barcodes and QR codes, are used in many areas (e.g., shipping, retail, warehousing, travel), there exists a need for quicker scanning of optical patterns. In some embodiments, optical patterns can include alpha and/or numerical characters. The following are techniques that can increase the speed, accuracy, and/or efficiency of scanning for optical patterns. The following techniques can be used individually, in combination with each other, and/or in combination with other techniques.

Illustrative Systems

FIG. 1 depicts an example technique for automated recognition and decoding of a pattern in an image containing multiple patterns. In FIG. 1, a system 100 (e.g., a mobile device) comprises a display 110 and a camera. The camera has a field of view (FOV) of a real scene. The camera is configured to capture one or more images (e.g., image 112) of the real scene. The real scene contains one or more optical patterns 114.

The camera can capture a plurality of images. The plurality of images can be presented in "real time" on the display 110 (e.g., presented on the display 110 in a sequential manner following capture, albeit potentially with some latency introduced by system processes). The image 112 is one of the plurality of images. The plurality of images depicts the real-world scene as viewed through the field of view of the camera. The real-world scene may include multiple objects 150, patterns, or other elements (e.g., faces, images, colors, etc.) of which the optical patterns 114 are only a part. FIG. 1 depicts a first optical pattern 114-1 and a second optical pattern 114-2, among other optical patterns 114.

The image 112 may be captured by the camera and/or provided via additional or alternative system processes (e.g., from a memory device, a communications connection to an online content network, etc.). The optical patterns 114 are detected and/or recognized in the image 112. Detection and recognition of optical patterns may describe different approaches for image analysis of optical patterns. Detection may describe detecting an optical pattern in an image by characteristic discrete patterns (e.g., parallel bars or symbols). Recognition may include additional analysis of the pattern that provides descriptive and/or characteristic information (e.g., an optical pattern type), specific to the optical pattern, but does not necessarily include decoding the optical pattern. For example, a barcode may be detected in an image based on image analysis revealing a region of the image containing multiple parallel bars. After additional analysis, the barcode may be recognized as a UPC code. In some embodiments, detection and recognition are concurrent steps implemented by the same image analysis process, and as such are not distinguishable. In some embodiments, image analysis of optical patterns proceeds from detection to decoding, without recognition of the optical pattern. For example, in some embodiments, an approach can be used to detect a pattern of characters, and in a second step decode the characters with optical character recognition (OCR).

Detecting optical patterns 114 permits automatic (e.g., without user interaction) generation and/or presentation on the display 110 of one or more graphical elements 122. In some embodiments, the graphical elements 122 may include, but are not limited to highlighted regions, boundary lines, bounding boxes, dynamic elements, or other graphical elements, overlaid on the image 112 to emphasize or otherwise indicate the positions of the optical patterns 114 in the plurality of images. Each optical pattern 114 may be presented with one or more graphical elements, such that a user is presented the positions of the optical patterns 114 as well as other metadata, including but not limited to pattern category, decoding status, or information encoded by the optical patterns 114.

The system 100 may identify one or more of the optical patterns 114 for decoding. As mentioned above, the decoding may be automated, initializing upon detection of an optical pattern 114 and successful implementation of a decoding routine. Subsequent to detection and/or decoding, object identifier information, optical pattern status, or other information to facilitate the processing of the optical patterns 114 may be included by a graphical element 122 associated with an optical pattern 114 that is decoded. For example, a first graphical element 122-1, associated with the first optical pattern 114-1, may be generated and/or presented via the display 110 at various stages of optical pattern detection and/or decoding. For example, after recognition, the first graphical element 122-1 may include information about an optical pattern template category or the number of patterns detected. Following decoding, the first graphical element 122-1 may present information specific to the first optical pattern 114-1. For an optical pattern 114 that is detected, but decoding is unsuccessful, the system 100 may alter a graphical element 122 to indicate decoding failure, as well as other information indicative of a source of the error. As an illustrative example, a second graphical element 122-2 may indicate that the second optical pattern 144-2 cannot be decoded by the system 100, for example, through dynamic graphical elements or textual information. For example, the second graphical element 122-2 is a yellow box surrounding the second optical pattern 114-2 after the second optical pattern 114-2 is detected; the second graphical element 122-2 is changed to a red box if the second optical pattern 114-2 is not decoded, or is changed to a green box if the second optical pattern 114-2 is decoded. Examples of graphical elements used during detecting and decoding optical patterns can be found in commonly owned U.S. patent application Ser. No. 16/905,722, filed on Jun. 18, 2020, which is incorporated by reference in its entirety for all purposes. Optical patterns can also be tracked, as described in commonly owned U.S. patent application Ser. No. 16/920,061, filed on Jul. 2, 2020, which is incorporated by reference in its entirety for all purposes.

Figure 2:
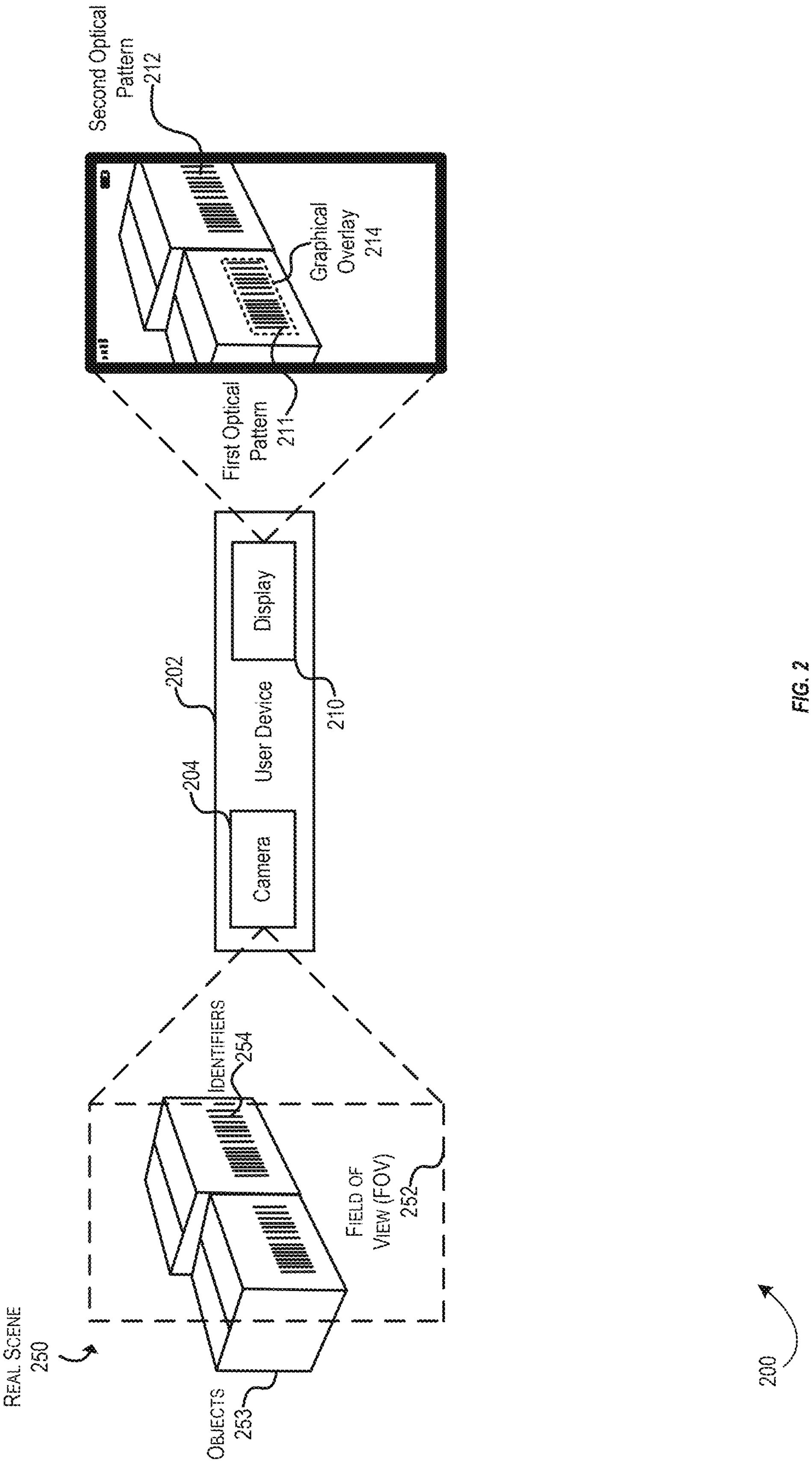
FIG. 2 illustrates a simplified diagram for an example decoding implementation, according to some implementations of the present disclosure.

FIG. 2 illustrates a simplified diagram for an example decoding implementation 200. As shown in FIG. 2, a user device 202 (which is an example of the user device with respect to FIG. 1) may be used to capture a plurality of images of a real scene 250 using a camera 204 having a field of view (FOV) 252. The real scene 250 may include an environment where optical patterns (e.g., barcodes) associated with one or more objects 253 (e.g., product packaging) may be captured by the camera 204. Throughout this disclosure, the term "optical patterns" is used. Barcodes and QR codes are two non-limiting examples of optical patterns. While barcodes are referenced frequently throughout this disclosure, it should be understood that optical patterns can refer to a pattern capable of being decoded for information and should not be limited to just barcodes. In a non-limiting example, the real scene 250 may be within a warehouse that stores products housed inside packages.

The camera 204 may be configured to capture images of the real scene 250. In some implementations, real scene 250 can include an environment surrounding the user device 202. In some implementations, the environment can be a portion of a retail environment that includes a portion of a shelving system. The shelving system can include multiple shelving units with each shelving unit including multiple shelves for supporting objects. Each object or shelf supporting each object can be affixed with an optical pattern. The images captured by the camera 204 can depict objects that are in the real scene 250 and the optical patterns (e.g., first optical pattern 211, second optical pattern 212, etc.) associated with those objects. For example, the camera 204 may capture images of shelves of a shelving unit.

By way of a non-limiting example, the images can depict the shelves, objects supported by the shelves, and optical patterns that are affixed to the objects themselves or the shelves supporting the objects. In some implementations, the images can be continuously captured and form part of a sequence of images such as image frames of a video. The captured images can be displayed on the display 210 of the user device 202 such that the objects and optical patterns associated with those objects can be viewed by a user of the user device 202. Throughout this disclosure, reference will be made to the term "user", "user device". These terms are referenced for clarity of discussion and should not be considered limiting. For example, a machine (e.g., robotic arm) may be implemented to perform techniques, processes, and/or methods as disclosed herein. In some implementations, as described in more detail below, the captured image can be displayed with one or more graphics (e.g., graphical overlay 214) overlaying the image. In some implementations, the captured images can be displayed in real-time such that the user of the user device 202 can be presented with a viewfinder and/or live view of the real scene 250. In some implementations, as described in more detail below, the user can use the viewfinder and/or live view of the scene to navigate through the retail environment. In some implementations, the captured images may be stored in a memory of the user device 202 and/or in a remote database such as a cloud-server and accessed at a later time for viewing and/or processing.

As previously mentioned, the user device 202 may capture a plurality of images of the real scene 250 including objects 253 that include identifiers 254 (e.g., barcodes, QR codes, etc.). The FOV 252 may capture an image of more than one identifier 254 such that more than one optical pattern is identified. In addition, or alternatively, while a user is using the user device 202, the user may be in motion and/or desires to change the FOV 252 to capture a specific identifier (or group of specific identifiers). In other examples, the user may attempt to acquire an optimal focus (e.g., readable) of the identifier 254 by moving the user device 202 towards and/or away from the objects 253 to enable a lens of the camera 204 to operate effectively.

The display 210 may provide a representation of some or all of the FOV 252 of the camera 204 to the user. The user device 202 may process the plurality of images of the real scene 250 to identify an intended optical pattern to be decoded. Throughout this disclosure, the term "intended" is used to describe a user intent. This term should not be considered limiting, and unless otherwise defined, should be interpreted as a correct result of an act of scanning, which involves capturing at least one image of at least one object, and achieving a desired result. For example, for three barcodes placed sequentially side by side, and the user would like to retrieve information about the center barcode, the intended barcode is the center barcode. Similarly, throughout this disclosure, the term "unintended" is used to describe a user intent. This term should not be considered limiting, and unless otherwise defined, should be interpreted as an unwanted result of an act of scanning, which involves capturing at least one image of at least one object, and not achieving a desired result. For example, for three barcodes placed sequentially side by side, and the user would like to retrieve information about the center barcode, the unintended barcode would be either the left barcode or the right barcode, but not the center barcode. In a non-limiting example, the user may direct the camera 204 towards an object of interest within an area of the FOV 252, which may generally be considered to be a point of focus, or intended focus of the user attempting to decode an identifier. The user device 202 may determine that the user has stopped moving the user device 202 (discussed in more detail with respect to FIG. 2) and that at least one identifier 254 may be within the FOV 252. The user device 202 may continually capture images as the user positions the camera or may only capture images upon receiving an input from the user.

In some embodiments, the user device 202 may decode identified optical patterns (e.g., first optical pattern 211). When the optical pattern is decoded, a location of the optical pattern may be stored for later reference and/or tracking. In some examples, the location may be tracked as long as the optical pattern is still within the FOV 252 of the camera 204 or, in situations where the optical pattern leaves the FOV 252 of the camera, the location may be estimated based on the plurality of images. For example, if the first optical pattern 211 appears to move to the left when exiting the FOV 252, the user device 202 may estimate an approximate location of where the optical pattern is expected to be relative to where the camera 204 is observing.

In some examples, there may be dozens up to hundreds of identifiers 254 within the FOV 252 (e.g., a high volume of disparate products in a pharmacy on a shelf). While the display 210 of FIG. 2 shows only two optical patterns for clarity of discussion, each of these optical patterns may represent only a percentage of a total number of optical patterns that may be captured in an image. In these examples, the user device 202 may decode a set of optical patterns according to various parameters (discussed in more detail with respect to FIG. 4). Each of the optical patterns in the set may be decoded individually and a respective location of those optical patterns tracked and stored in memory (e.g., storage subsystem 1004 with respect to FIG. 8). Decoding may involve reading the optical pattern, converting the optical pattern into a numerical (or alpahnumberical) representation (e.g., 14806920224 or 1X48B20224), and storing that representation along with associated parameters in memory. This process may repeat for each optical pattern in the FOV 252 of the camera 204. In some examples, once an optical pattern has been decoded, the user device 202 may reference a location associated with that optical pattern and not decode that optical pattern a second time. In this manner, processing power is reduced since duplicates do not undergo additional decoding and memory storage may store less data in a similar manner.

As previously mentioned, decoding may include detecting optical patterns depicted in images and decode the detected optical patterns to obtain code data for the detected optical patterns. In other implementations, the images can be images that are retrieved from another source such as database or server. A detailed description of detecting and decoding multiple optical patterns depicted in images is described in commonly owned U.S. Pat. No. 10,963,658, which is hereby incorporated by reference in its entirety and for all purposes.

In some implementations, the user device 202 may be configured to accumulate a predetermined number of images and detect and decode optical patterns from the predetermined number of images (e.g., identifier 254 present in two or more images, sequentially or non-sequentially). A detailed description of tracking multiple optical patterns in multiple captured images is described in commonly owned U.S. patent application Ser. No. 17/890,087, filed on Aug. 17, 2022, which is hereby incorporated by reference in its entirety and for all purposes. The code data for the optical patterns can be stored in a memory (not depicted) of the user device 202 and/or in a remote database such as a cloud-server and accessed at a later time for viewing and/or processing. In some implementations, user device 202 may be configured to determine a number of optical patterns detected in an image or FOV 252 of the camera 204, determine a number of optical patterns decoded in the image or FOV 252, and compare the number of optical patterns detected in the image or FOV 252 to the number of optical patterns decoded in the image or FOV 252.

In some examples, the user device 202 may display, using display 210, a graphical overlay 214 that at least partially surrounds at least one optical pattern. The graphical overlay 214 may be a suitable shape including, but not limited to, rectangular, circular, or polygonal. The graphical overlay 214 may be a solid line or dashed line which outlines the selected shape (as depicted). The graphical overlay 214 may be a suitable color and/or transparency. The graphical overlay 214 can be solid in color. The graphical overlay 214 may be displayed once the user device 202 confirms an intended optical pattern. The user may receive an additional indication when the user device confirms the intended optical pattern such as, but not limited to, a noise, a visual indicator (e.g., light blinking on user device), or haptic feedback (e.g., a vibration).

In some examples, the FOV 252 may include a group of optical patterns (e.g., first optical pattern 211, second optical pattern 212, etc.). More than one optical pattern of the group of optical patterns may be considered an intended pattern. In some embodiments, an object may include more than one optical pattern grouped on a label (e.g., EAN/UPC add-on barcodes, composite codes, etc.). The grouped optical patterns may identified as intended optical patterns and successive decoding of the grouped optical patterns may cease.

Smart Barcode Detection

Figure 3:
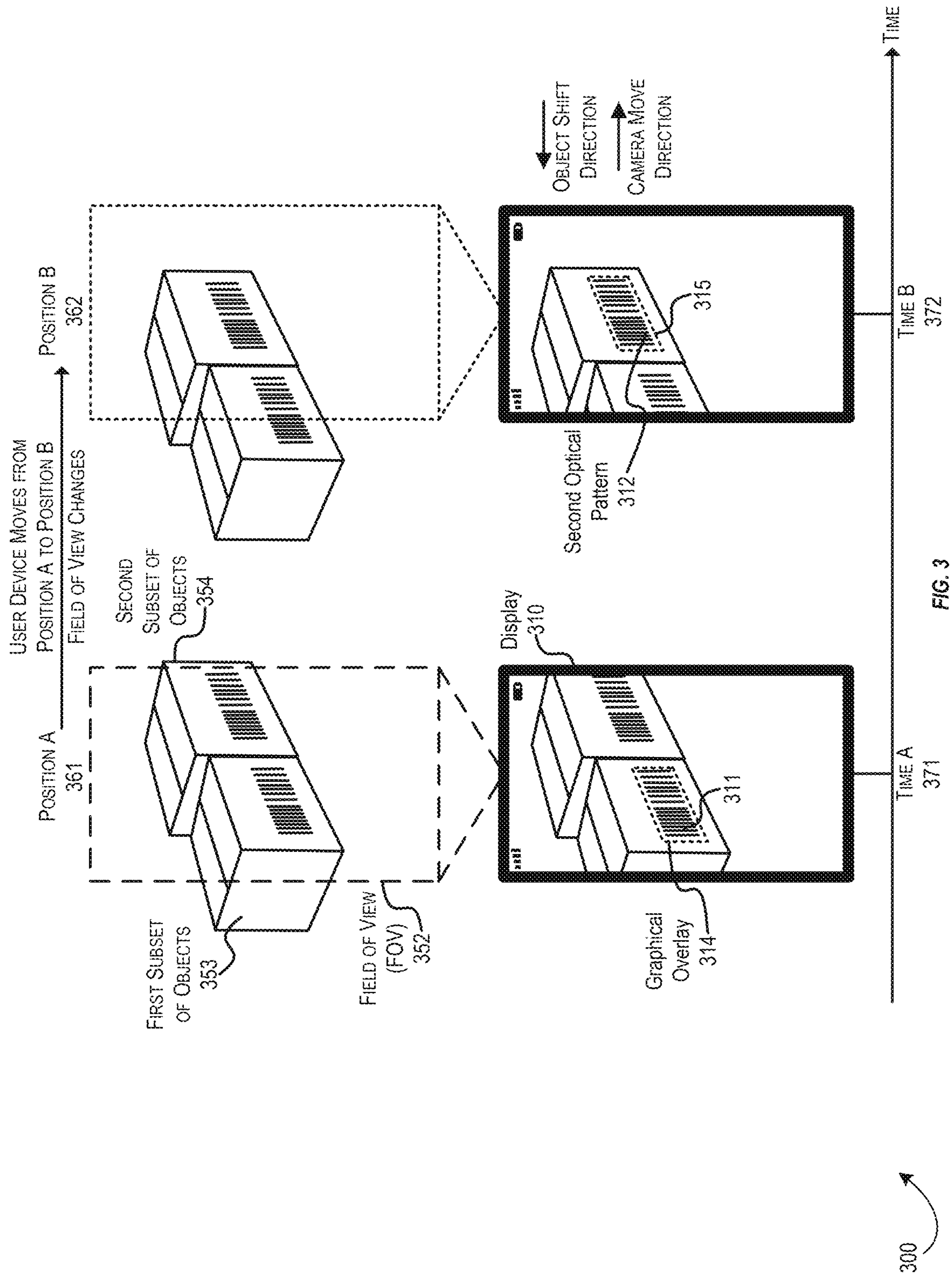
FIG. 3 illustrates a simplified temporal diagram for an example optical pattern selection method, according to some implementations of the present disclosure.

FIG. 3 illustrates a simplified temporal diagram 300 for an example optical pattern selection method. As discussed with respect to FIGS. 1 and 2, a user may use a user device (e.g., user device 202 with respect to FIG. 2) to decode one or more optical patterns (e.g., first optical pattern 311, second optical pattern 312, etc.). The user device, while in use, may be moved between objects 353 to capture various identifiers in order to perform one or more operations (e.g., log objects in a database, identify contents of objects, retrieve prices for the objects, etc.). While in motion, a camera of the user device may capture one or more images or video (e.g., sequential image frames) of identifiers the user intends on decoding (along with identifiers the user does not intend on decoding). To determine an intended optical pattern (e.g., pattern a user wants to decode), one or more processors of the user device may process the images or video to determine if an optical pattern has been decoded previously and to prevent additional decoding. However, while in motion, more than one optical pattern may be identified as an intended optical pattern as the FOV 352 passes across various identifiers. In these examples, a comparison of the images (or video) may be performed to determine when the user device has stopped moving (or about to stop moving) in order to improve a confidence that the user intends on decoding a specific optical pattern.

By way of a non-limiting example, a scene may include a first subset of objects 353 (e.g., one or more packages) with identifiers (e.g., barcodes) within a FOV 352 of the camera of the user device and a second subset of objects 354 (e.g., one or more packages) that may be at least partially in view of the FOV 352. The images captured of the first subject of objects 353 may be compared to one another to determine if the user has moved the FOV 352 of the camera from position A 361 at time A 371 to position B 362 at time B 372. The comparison may use a similarity score algorithm to produce a similarity score between two or more images (e.g., image frames) to determine that the user device (e.g., camera) is in motion. In an example, a structural similarity index measure (SSIM) may be used to analyze illumination, image structure, contrast, or suitable equivalents, to produce a score, for example, between zero and one, where values closer to zero indicate greater changes between the images and values closer to one (or higher than one in certain embodiments) indicate fewer changes between the images.

Continuing the previous non-limiting example, once the similarity score reaches a threshold value (e.g., between 0.5 and 0.75) for the images compared, the user device may determine that a specific optical pattern associated with the first subset of objects 353 or the second subset of objects 354 is the intended optical pattern to be processed. In some examples, the camera may decode and/or process several optical patterns to ascertain which optical pattern is intended by logging positions of each of the optical patterns and/or recording which optical patterns have already been decoded. In some embodiments, the optical patterns may be tracked across two or more images (e.g., image frames) and if the optical pattern is still within the FOV, success reads on the optical pattern will not occur. In this manner, unintentional processing of optical patterns which are not intended may be mitigated by tracking optical patterns which have already been decoded and/or processed.

Figure 4:
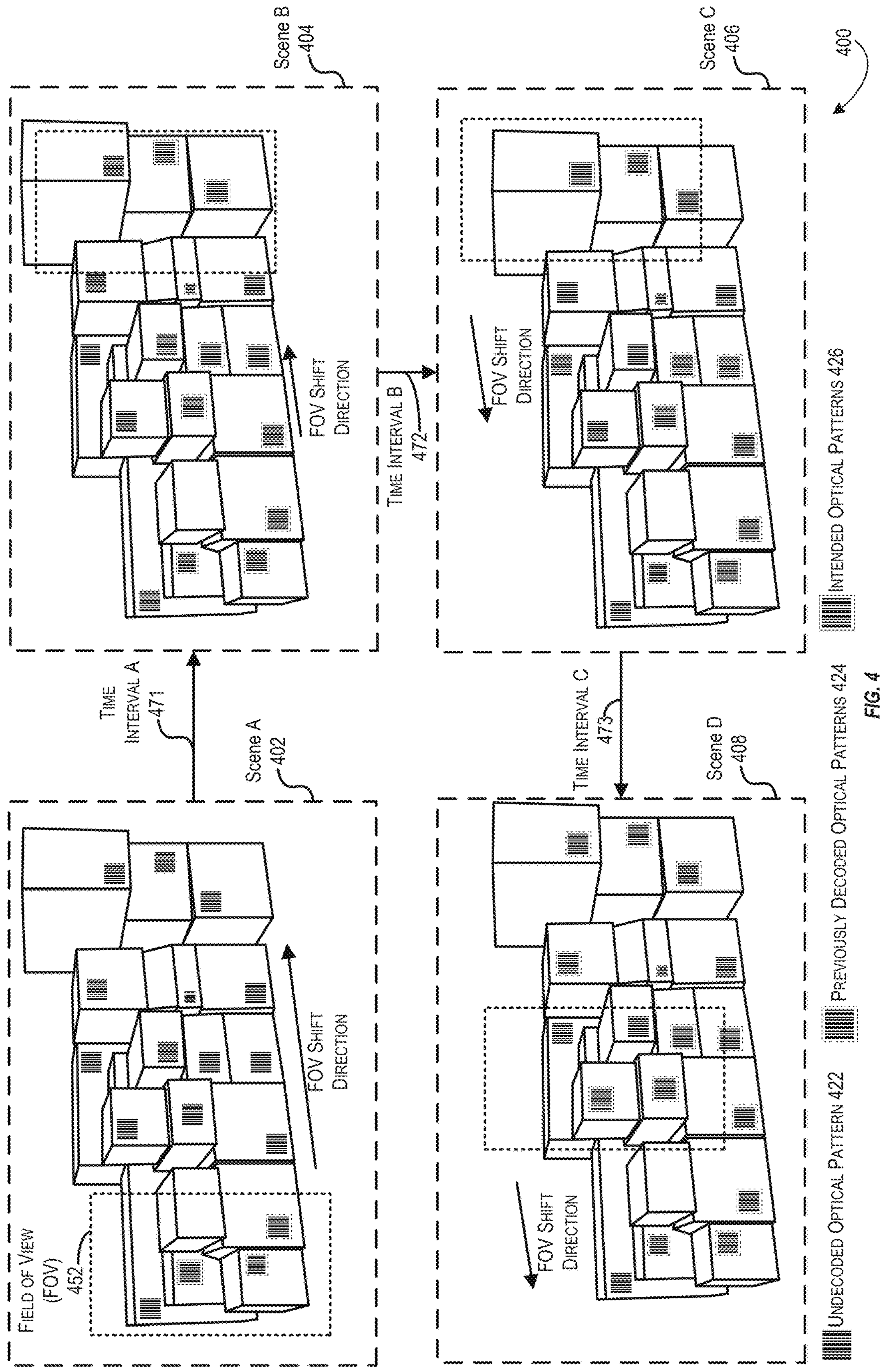
FIG. 4 illustrates a simplified diagram for an example smart duplicate filter method, according to some implementations of the present disclosure.

FIG. 4 illustrates a simplified diagram for an example smart duplicate filter method 400, according to some implementations of the present disclosure. By way of a non-limiting example, the method 400 depicts four different scenes representing four "snapshots" in time as a user uses a user device (e.g., user device 202 with respect to FIG. 2) to scan optical patterns of a plurality of objects (e.g., boxes) in a direction (e.g., direction illustrated by the FOV shift direction). A field of view (FOV) 452 of the user device is shown as a dotted rectangle across the four scenes. For example, in scene A 402, the FOV 452 captures a number of objects with a number of optical patterns. The user device may ascertain a location of one or more of the optical patterns associated with the objects. In this example, an intended optical pattern 426 located relatively close to a center of the FOV 452 (discussed in more detail with respect to FIG. 4) may be ascertained, depicted with a solid line box. Two additional optical patterns are shown within the FOV 452 with a dashed line which represent previously decoded optical patterns 424. Further, one optical pattern shown on the top left box is shown without an outline is an undecoded optical pattern 422. While the FOV 452 is shown as a limited rectangle, it should not be considered limiting, and it should be recognized that the FOV 452 may include a portion or an entirety of the scenes A-D 402-408. Each scene A-D 402-408 may represent a real scene (e.g., real scene 250) imaged by a camera with the FOV 452 of the user device.

After a time interval A 471 (e.g., a few seconds), the user device may be moved (e.g., by a user or machine) to capture additional optical patterns. As shown in scene B 404, when the user device shifts in the FOV shift direction across the intermediate positions, objects may be decoded in the intermediate positions (as discussed in more detail with respect to FIGS. 2-6). During scanning operations, the user may not have captured all desired optical patterns and may desire to capture optical patterns near the top of the objects as shown in scenes C 406 (after time interval B 472) and scene D 408. However, during this, several unintended optical patterns may shift into the FOV 452 as shown in scene D 408, after time interval C 473, which includes several previously decoded optical patterns 424. The user device may process the previously decoded optical patterns 424 and/or retrieve locations of the previously decoded optical patterns 424 in order to make a determination on whether or not to prevent decoding of the previously decoded optical patterns 424 (discussed in more detail with respect to FIGS. 3, 5, and 6). In this manner, unintentional decoding of previously decoded optical patterns 424 (e.g., intended optical patterns 426 that were decoded) may be tracked subsequent decoding may be prevented.

In certain embodiments, only the previously determined optical pattern is tracked. The previously determined optical pattern may be tracked as long as the previously determined optical pattern is in the FOV 452 of the camera. In a non-limiting example, a user may point a user device at an object with a first optical pattern that the user wants to decode. The first optical pattern may be determined as the intended optical pattern. The user device may then report the first optical pattern as the intended optical pattern to the user. The user, intending to decode a new optical pattern, may then point the camera at a second optical pattern which will subsequently cause the intended optical pattern to switch from the first optical pattern to the second optical pattern. While the user keeps the FOV on the second optical pattern, the second optical pattern will not be decoded again. In an instance where the user moves back to the first optical pattern, the process may repeat where the intended barcode switches from the second optical pattern to the first optical pattern, where the first optical pattern may be reported to the user again.

Figure 5:
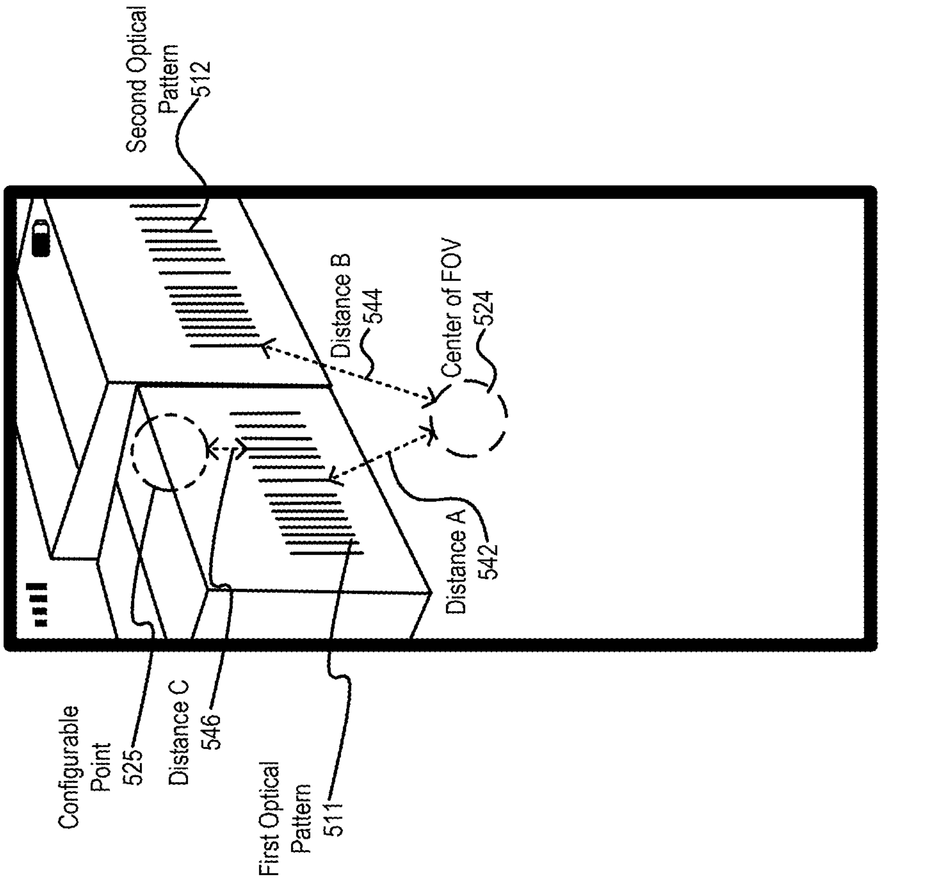
FIG. 5 illustrates a simplified diagram for an example optical pattern selection method, according to some implementations of the present disclosure.

FIG. 5 illustrates a simplified diagram for an example optical pattern selection method 500. In some embodiments, ascertaining which optical pattern is the intended optical pattern may include ascertaining a parameter associated with the optical pattern. For example, the parameter may include a distance (e.g., distance A 542) between a center of a FOV (e.g., center of FOV 524) and an optical pattern (e.g., first optical pattern 511). The distance may be compared to a threshold distance to determine if the optical pattern is an intended optical pattern. The threshold distance may be in terms of a percentage of a total FOV. For example, a distance between first edge (e.g., top edge) and a second edge (e.g., bottom edge) of the FOV may be considered as a percentage (e.g., one hundred percent). A sub-distance between the first edge and the second edge may be considered as a fraction of that percentage. For example, if the first optical pattern 511 is near the center of the FOV, the percentage may be fifty percent, or half of the distance between the two edges.

In some examples, the parameter may include, without limitation, a relative size of the optical pattern (e.g., how large the barcode appears in the FOV), a relative location of the optical pattern (e.g., how close to a center of the FOV), positions of proximal optical patterns (e.g., barcodes on adjacent products that are within the FOV), or combinations thereof. An image score may be calculated based at least in part on the parameter. For example, one or more images may be analyzed to determine if an optical pattern of a plurality of optical patterns includes a parameter which enables determination of an intended optical pattern. Each of the one or more images may have an image score applied to perform a comparison of the optical patterns. For example, an image score may be based at least in part on the parameter. In some examples, the image score may be between zero and one, with a higher score indicating a better image score (e.g., intended optical pattern identified) and a lower score indicating a weaker image score (e.g., intended optical pattern not found). The image scores may be compared to a threshold value (e.g., within 0.5 of one) to determine whether or not an intended optical pattern has been found.

In a non-limiting example, when determining whether or not an optical pattern is an intended pattern, the images scores may be produced for each image captured. In an example, for a series of ten image captures, then ten image scores may be produced. Image scores may then be compared across the images to determine which image (or image frame) has the greatest image score. The highest image scoring image may then be displayed and/or framed (e.g. frame 315 with respect to FIG. 3) to the user.

In a non-limiting example, a configurable point 525 may be selected by a user and/or by the user device. The configurable point may be a location within the FOV of the display that is not the center of the FOV. In this example, a distance (e.g., distance C 546) may be based on a distance from the optical pattern (e.g., first optical pattern 511) to the configurable point 525. While the configurable point 525 and center of the FOV 524 are shown as dashed circles, it should not be considered limiting, and any suitable configuration of the configurable point 525 and center of the FOV 524 may be implemented. As an example, configurable point 525 and center of the FOV 524 may be transparent or partially transparent. One or both of configurable point 525 and center of the FOV 524 may be suitably shown prior to and/or during operation.

In some embodiments barcode scores (sometimes referred to as optical-pattern scores) are used. In some configurations, barcode selection scoring is used. By using the previous parameters computed during the image scoring process, barcodes in the image can be given a barcode (or optical-pattern) score. For example, the largest barcode (by area) in the image and/or the barcode that is closest to the center of the image is given a higher score. The barcode with the highest score is returned to the user. Barcode scoring can be performed in addition to or in lieu of image scoring.

Figure 6:
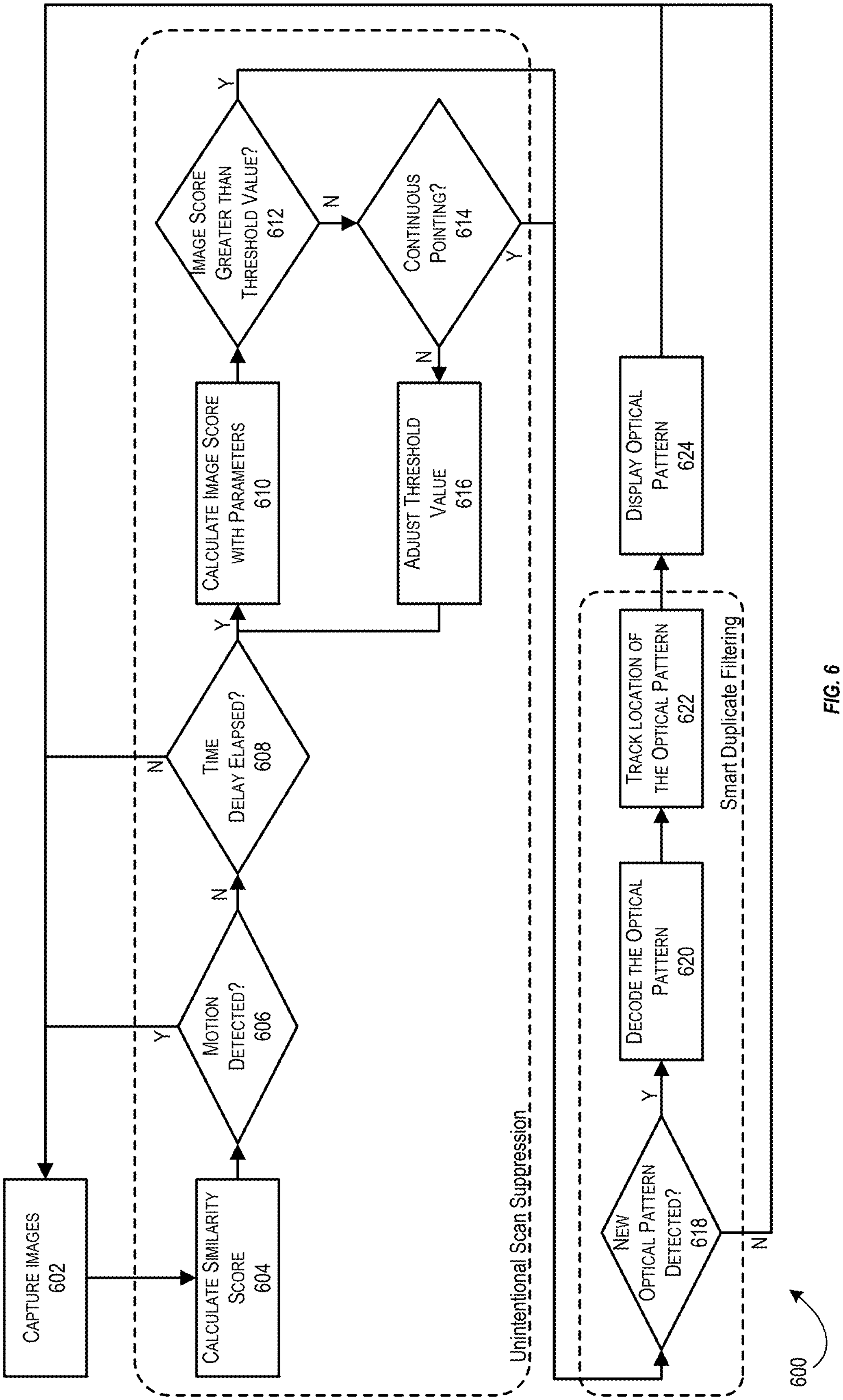
FIG. 6 illustrates a simplified flow diagram for smart barcode detection, according to some implementations of the present disclosure.

FIG. 6 illustrates a simplified flow diagram 600 for smart barcode detection. One or more non-transitory computer-readable storage medium may store computer-executable instructions that, when executed by at least one processor, cause at least one computer or system to perform part and/or all of the operations of the flow. It should be appreciated that the operations of the flow may be performed in any suitable order, not necessarily the order depicted in FIG. 6. Further, the flow may include additional, or fewer operations than those depicted in FIG. 6. The operations of flow diagram 600 may be performed by any suitable portion of the user devices of FIGS. 1-4 which may include one or more computing devices such as computing device 1000 of FIG. 10.

By way of example, the flow diagram 600 may begin at block 602 where a camera (e.g., camera 204 with respect to FIG. 2) may capture images of a scene that may include identifiers (e.g., optical patterns, barcodes, QR codes, and the like) capable of being decoded to yield data associated with at least one object in the scene. The images may be captured concurrently, sequentially, by user selection, or may be automatically captured. The dashed lines indicate general flow processes and should not be considered limiting. For example, the dashed area for unintentional scan suppression includes blocks directed towards identifying optical patterns that the user (or machine) intends to scan. The dashed area for smart duplicate filtering includes blocks directed towards identifying optical patterns that have been and have not been decoded.

At block 604, a similarity score may be calculated between two or more images. The similarity score may be a pixel-based similarity measure which compares pixel values of two or more images by averaging a squared difference between the specific pixels. The similarity score may determine one or more differences or similarities between two or more images. In addition, or alternatively, an algorithm (e.g., Faster R-CNN machine learning model) may determine whether motion exists between the images.

At block 606, a determination on whether or not motion has occurred may made based at least in part on the similarity score and/or can be based on a motion detection algorithm based on the similarity of the current image frame with respect to the previous one (e.g., pixel-based similarity measure). In some implementations, the motion detection can be based on information provided by a gyroscope/accelerometer (e.g., to detect whether the device for scanning barcodes such as a mobile phone is moving). Motion detection may occur for each image captured. If motion is detected, the method may proceed back to block 602. If motion is not detected (or is within a motion threshold), the method may proceed optionally to block 608 or continue to block 610.

At block 608, a time delay may occur. In some examples, the time delay may be optional. The time delay may be between 0.01 milliseconds (ms) and one second. The time delay may occur after motion is determined to have stopped (e.g., stationary camera or real scene) as determined at block 606. The time delay may function as a buffer to provide a delay between decoding optical patterns to limit and/or reduce unintentional decoding of unintended optical patterns by giving the user more time to position the FOV of the camera.

At block 610, optical-pattern scores may be calculated from parameters associated with the one or more optical patterns. As discussed previously, parameters such as relative size of the optical pattern (e.g., how close the barcode is to the camera) may be used to calculate the optical-pattern scores. For example, a first optical pattern representing a first identifier that is physically closer to the camera than a second optical pattern representing a second identifier that is physically farther away from the camera may have a greater optical-pattern score than the second optical pattern. The flow may then proceed to block 612.

At block 612, a comparison on optical-pattern scores to a threshold value may be performed. Once the optical-pattern score is higher than the threshold value, the optical pattern may be determined as having an intentional read (e.g., the user intended to decode a specific optical pattern). In this example, if the optical-pattern score is greater than the threshold value, the method may proceed to block 618. If the optical-pattern score is not greater than the threshold value after the time interval has expired, or by user selection, the method may proceed to block 614.

At block 614, a determination is made on whether the optical pattern has been detected in continuous images by way of the user continuously "pointing" the camera at the optical pattern. For example, if the optical pattern that is potentially the intended optical pattern is detected in a percentage of images over a time interval, (e.g., optical pattern in at least seventy percent of images over a second), the method may proceed to block 618. If the optical pattern is not determined to be within the percentage of images of the time interval, the method may proceed to block 616.

At block 616, the threshold value may be adjusted over time to become more lenient if a result is not given to the user for a time interval (e.g., from 0.1 ms to two seconds). For example, the threshold value may be within 0.25 of one (e.g., normalized to one) initially but if the result is not given within half a second, the threshold value may be adjusted to an adjusted threshold value to be any value within 0.5 of one. The threshold value may be re-determined according to a predetermined schedule, by user selection, or automatically. The flow may then return to block 610. Optionally, the flow may return to any preceding block. A feedback stop algorithm may be implemented at block 616 (or any other block) if a result is not given within a threshold amount of cycles (e.g., no optical pattern identified in ten cycles of returning to block 616). In these examples, the feedback stop algorithm may cause the flow proceed to block 602 to restart the cycle and/or may request feedback and/or direct the user to perform an action (e.g., move the optical pattern closer or farther away from the camera).

At block 618, the potential intended optical pattern may undergo processing to determine if the optical pattern is a new optical pattern (e.g., a pattern not previously decoded). In this non-limiting example, the optical pattern may be analyzed to determine if the optical pattern left a field of view (FOV) of the camera and/or if the optical pattern had been previously tracked (e.g., location, position, etc.). If the optical pattern had been previously detected, the flow may return to block 602 to begin looking for new optical patterns. If the optical pattern had not been previously detected, the flow may proceed to block 620.

At block 620, the optical pattern identified at block 618 may be decoded. Decoding may involve the camera capturing one or more images and relaying the images to software, hardware, firmware, or combinations thereof, to convert the optical pattern into encoded data by interpreting variations in the optical pattern as readable text, numbers, and/or symbols. Examples of techniques to detect, decode, and track optical patterns in a real scene can be found in U.S. application Ser. No. 16/920,061, filed on Jul. 2, 2020, issued as U.S. Pat. No. 10,963,658 B1 on Mar. 30, 2021, which is incorporated by reference herein in its entirety and for all purposes. In some examples, not depicted, motion is continually monitored in each step. For example, if motion is detected during decoding at block 620, the method may proceed back to block 602 until a determination that motion has stopped (or is within a motion threshold). Decoding may involve the camera capturing one or more images and relaying the images to software, hardware, firmware, or combinations thereof, to convert the optical pattern into encoded data by interpreting variations in the optical pattern as readable text, numbers, and/or symbols. Examples of techniques to detect, decode, and track optical patterns in a real scene can be found in U.S. application Ser. No. 16/920,061, filed on Jul. 2, 2020, issued as U.S. Pat. No. 10,963,658 B1 on Mar. 30, 2021, which is incorporated by reference herein in its entirety and for all purposes. The flow may then proceed to block 622.

At block 622, a location of the optical pattern decoded may be tracked and stored in memory. The location may be a location relative to the FOV of the camera or may be an estimated position outside of the FOV (e.g., an estimated panoramic location). An identifier may be stored along with the optical pattern for case in comparing identical optical patterns (e.g., tracking location by identifier rather than differing optical patterns).

At block 622, the optical pattern may be displayed, with and/or without a graphical overlay to indicate that the optical pattern is intended by the user of the user device. In some examples, the optical pattern may be displayed substantially contemporaneously with the user using the user device. According to certain embodiments, the flow may return to block 602. Optionally, the graphical overlay may include a message or interactable button to confirm the optical pattern as the intended optical pattern.

Illustrative Methods

Figure 7:
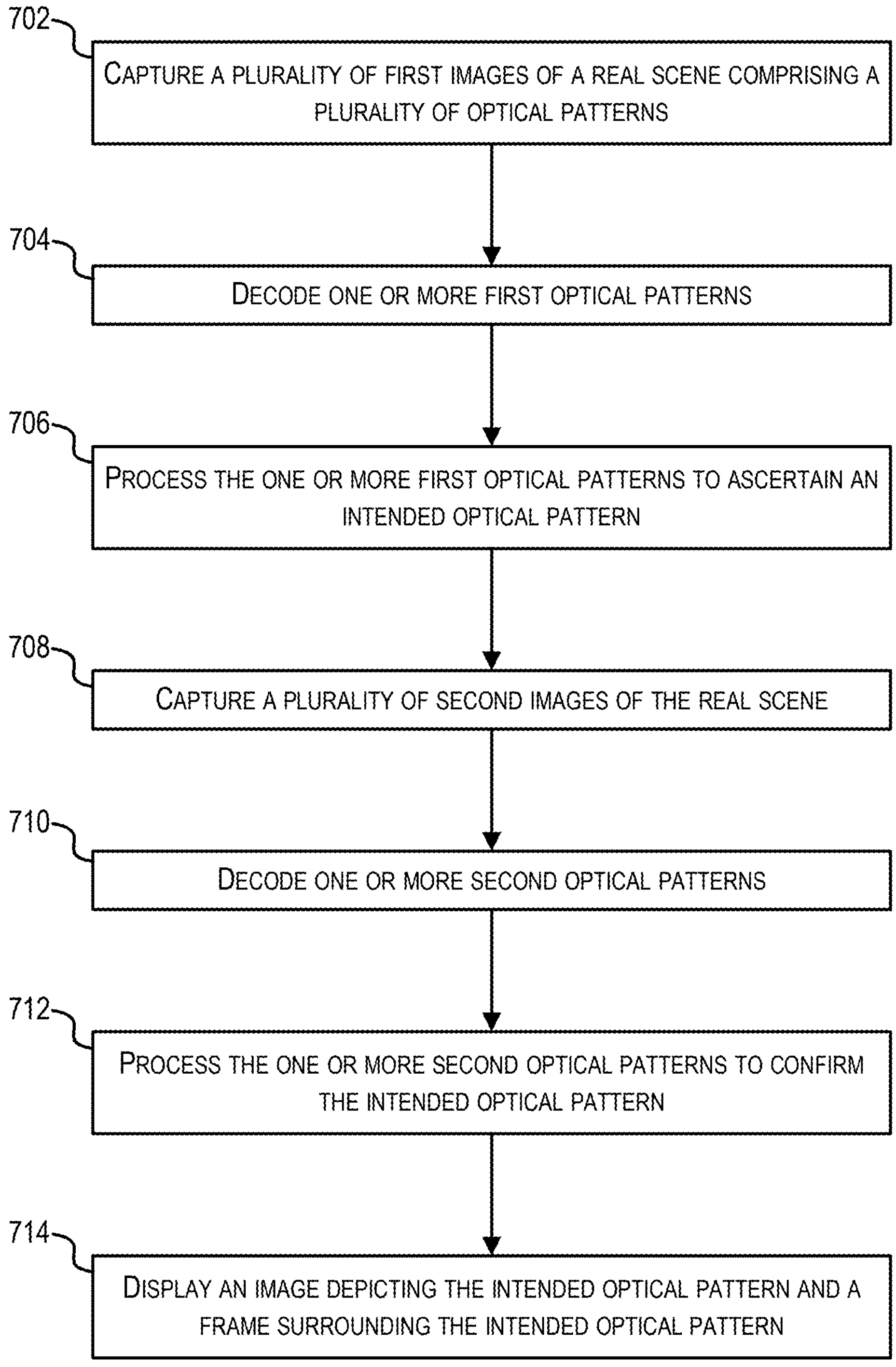
FIG. 7 illustrates an example process for smart barcode detection, according to some implementations of the present disclosure.

FIG. 7 illustrates a simplified example process 700 for smart barcode detection. One or more non-transitory computer-readable storage medium may store computer-executable instructions that, when executed by at least one processor, cause at least one computer or system to perform part and/or all of the operations of the process 700. It should be appreciated that the operations of the process 700 may be performed in any suitable order, not necessarily the order depicted in FIG. 7. Further, the process 700 may include additional, or fewer operations than those depicted in FIG. 7. The operations of process 700 may be performed by any suitable portion of the user devices as disclosed in FIGS. 1-4 which may include one or more computing devices such as computing device 1000 of FIG. 10.

The method may begin at block 702, where a user device (e.g., system 100 with respect to FIG. 1) may capture a plurality of first images of a real scene (e.g., real scene 250 with respect to FIG. 2) comprising a plurality of optical patterns (e.g., first optical pattern 311, second optical pattern 312 with respect to FIG. 3). A location of the optical pattern may be ascertained within a FOV of the camera and stored in memory.

At block 704, the user device may decode one or more first optical patterns. If motion is detected during decoding, the decoding may be paused until movement is determined to have stopped. Once movement is determined to have stopped (as discussed with respect to FIG. 3), the decoding may resume, and decoding of the optical patterns may continue. In some examples, the user device may ascertain that some or all of the first optical patterns within the FOV have been decoded and cease decoding additional optical patterns until a movement of the user device, camera, and/or scene occurs.

At block 706, the user device may process the one or more first optical patterns to ascertain an intended optical pattern. For example, the user device may identify each optical pattern that has been previously decoded in order to increase confidence in an intended optical pattern. In some examples, the intended optical pattern may be determined based at least in part a proximity to a center location of the FOV, a size of the optical pattern, or suitable equivalents.

At block 708, the user device may capture a plurality of second images of the real scene. For example, a user may move the camera to capture a different FOV in order to focus on an intended optical pattern which includes different optical patterns. Similar to the first images, the second images may include second optical patterns. Some of the second optical patterns may include some or all of the first optical patterns.

At block 710, the user device may decode one or more second optical patterns. If motion is detected during decoding, the decoding may be paused until movement is determined to have stopped. Once movement is determined to have stopped (as discussed with respect to FIG. 3), the decoding may resume and decoding of the optical patterns may continue. In some examples, the user device may ascertain that some or all of the second optical patterns within the different FOV have been decoded and cease decoding additional optical patterns until a movement of the user device, camera, and/or scene occurs.

At block 712, the user device may process the one or more second optical patterns to confirm the intended optical pattern. For example, processing the second optical patterns may include ascertaining that the second optical patterns have been previously decoded by referencing the location of each of the second optical patterns. In addition, or alternatively, successive decoding may be prevented or otherwise mitigated until an additional movement is detected (e.g., based on the first or second images). In some examples, the intended optical pattern may be confirmed based at least in part on the one or more first optical patterns (or second optical patterns) being within a threshold distance of an aiming indicator (e.g., an aimer superimposed on the display configured to help a user align the camera FOV with an indicator). The aiming indicator may be a circle, square, any suitable polygon (e.g., hexagon, pentagon, trapezoid, skewed trapezoid, etc.), a character, a number, or any suitable equivalent. In some embodiments, the intended optical pattern may be ascertained by a direction of movement of the camera (e.g., movement towards the intended optical pattern).

At block 714, the user device may display an image depicting the intended optical pattern and a graphical overlay (e.g., graphical overlay 214 with respect to FIG. 2) surrounding the intended optical pattern (e.g., first optical pattern 211 with respect to FIG. 2). In some examples, the optical pattern is continuously displayed in substantially contemporaneously with the capturing of the real scene to aid in the user capturing the intended optical pattern.

Figure 8:
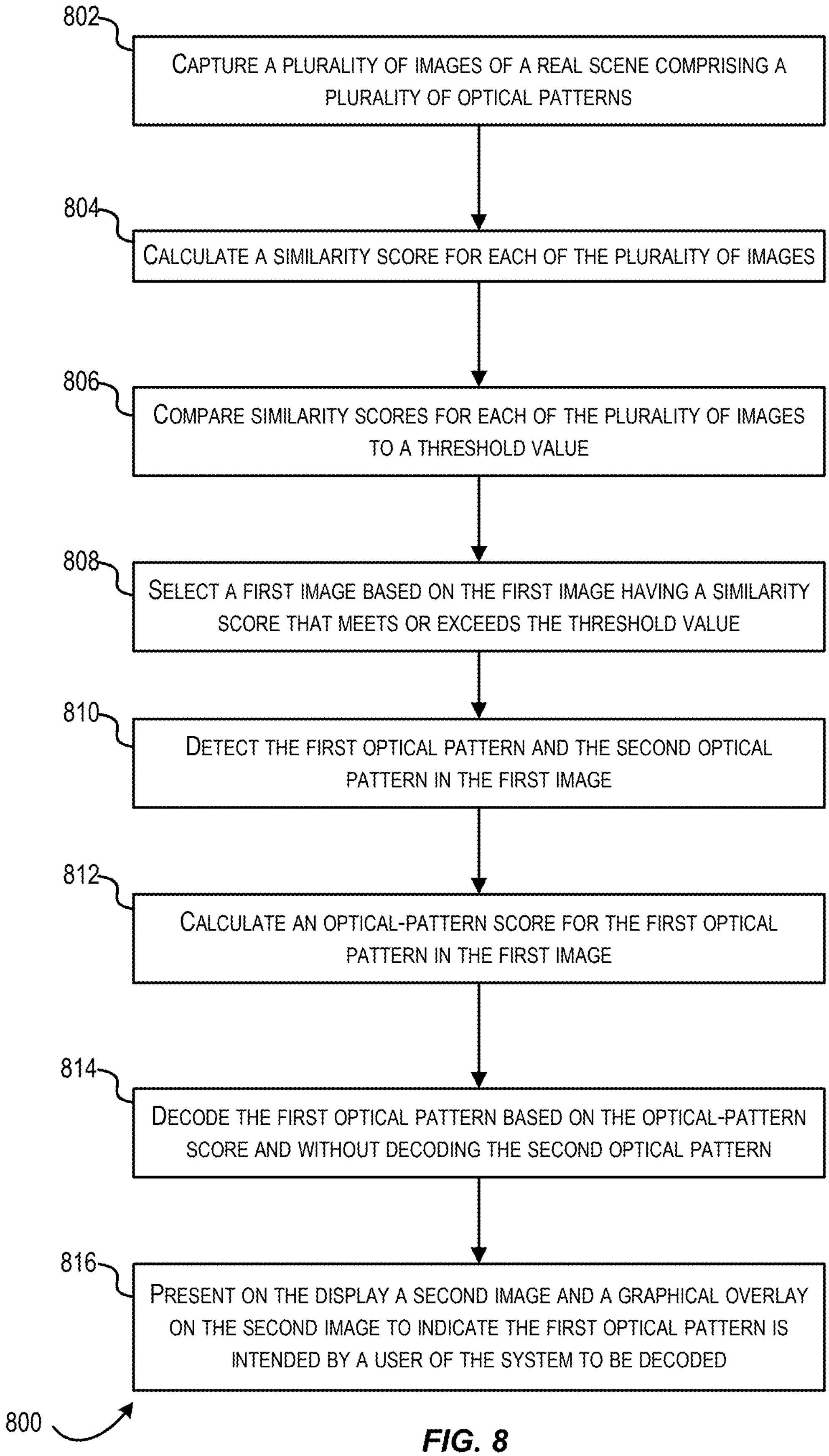
FIG. 8 illustrates an example process for unintentional scan suppression, according to some implementations of the present disclosure.

FIG. 8 illustrates an example process 800 for unintentional scan suppression. One or more non-transitory computer-readable storage medium may store computer-executable instructions that, when executed by at least one processor, cause at least one computer or system to perform part and/or all of the operations of the process 800. The operations of process 800 may be performed by any suitable portion of the user devices as disclosed in FIGS. 1-4 which may include one or more computing devices such as computing device 1000 of FIG. 10.

The method may begin at block 802, where a camera (e.g., camera 204 with respect to FIG. 2) may capture a plurality of images of a real scene comprising a plurality of optical patterns. The plurality of images of the real scene may be images within a field of view (FOV) of the camera and contain information related to one or more real world objects associated with the plurality of optical patterns.

At block 804, the process may calculate a similarity score for each of the plurality of images. The similarity score, as discussed previously, may be used to determine whether or not the camera, and/or an object in the real world scene, is in motion. For example, an image by image comparison may be performed to determine one or more changes. These between images may be changes on a pixel-by-pixel basis. In some examples, the similarity score may account for small changes caused by a user holding the user device in their hand (e.g., minor sways of 0.1 inches to a few inches as a result of normal muscle movements when holding an item still).

At block 806, the process may compare similarity scores for each of the plurality of images to a threshold value. The threshold value may be pre-defined and/or based on historical data. In some examples, the threshold value may be entered by the user of the user device or by machine (e.g., learned).

At block 808, the process may select a first image based on the first image having a similarity score that meets or exceeds the threshold value. For example, the first image may include an image of optical patterns in focus that can be decoded and have a first similarity score (e.g., between 0.5 and one on a scale of one) whereas a second image may have a second similarity score lower than the first similarity score (e.g., between 0.1 and 0.4 on a scale of one). In this example, the first image would be selected.

In some embodiments, a subset of images of the plurality of images having similarity scores that meet or exceed the first threshold value may be identified. Image scores for each image of the subset of images may then be calculated for comparison. For example, the image scores (e.g., between zero and one, where zero is an image without readable optical patterns and one is an image with at least one readable optical pattern in focus) of each image of the subset of images may be compared to a second threshold value (e.g., one or a scale of one), and, based on an image score of the first image meeting or exceeding the second threshold value, selecting the first image. The second threshold value may fluctuate with time and drop over time (e.g., from one to 0.75 on a scale of one) for time intervals where an image of the subset of images is not identified as having an image score that exceeds the second threshold value. In some examples, the image score may be based on how far an optical pattern of the plurality of optical patterns is from a center of an image, with a higher value for at least one optical pattern being closer to the enter of the image.

At block 810, the process may detect the first optical pattern and the second optical pattern in the first image. For example, one or more object identification algorithms may be utilized to detect the first optical patter and the second optical pattern within the image. Examples of techniques to detect, decode, and track optical patterns in a real scene can be found in U.S. application Ser. No. 16/920,061, filed on Jul. 2, 2020, issued as U.S. Pat. No. 10,963,658 B1 on Mar. 30, 2021, which is incorporated by reference herein in its entirety and for all purposes.

At block 812, the process may calculate an optical-pattern score for the first optical pattern in the first image. For example, the optical-pattern score may include a size of a largest optical pattern area (as seen in the FOV of the camera), a positional relationship with respect to other optical patterns, a distance from a center of the first image, or combinations thereof. In some examples, an optical-pattern score for each optical pattern in the first image may be calculated. For example, an optical-pattern score for the second optical pattern may be calculated based on how far the second optical pattern is from the center of the first image (as discussed in more detail with respect to FIG. 5). The optical-pattern score of the first optical pattern may be compared to the optical-pattern score of the second optical pattern. Distances (e.g., distance A 542, distance B 544 with respect to FIG. 5) may then be ascertained to determine which of the first and second optical pattern is closer to the center of the first image.

At block 814, the process may decode the first optical pattern based on the optical-pattern score and without decoding the second optical pattern so that the first optical pattern is the only pattern of the plurality of optical patterns decoded in the first image. In addition, or alternatively, decoding may occur after detecting the plurality of optical patterns in the first image. In some examples, decoding may be started, paused, and/or ended based on detecting motion. Decoding the first optical pattern and not the second optical pattern in the first image based on the first optical pattern being closer to the enter of the first image than the second optical pattern as discussed with respect to block 812.

At block 816, the process may present, on the display, a second image and a graphical overlay on the second image to indicate the first optical pattern is intended by a user of the system to be decoded. In some examples, the graphical overlay includes a graphic that wraps around at least a portion of a perimeter of the first optical pattern. The graphical overlay can be a frame or outline (e.g., around the first optical pattern), a highlight, a line (e.g., underlining the first optical pattern), an arrow, or other graphic. In addition or alternatively, the graphical overlay may coincide with a notification including, without limitation, a noise (e.g., a beep), haptic feedback (e.g., a vibration), and/or an interactable interface (e.g., confirmation button).

In some configurations, unintentional scan suppression includes variants: (1) unintentional scan suppression that allows scanning in the full frame; and (2) unintentional scan suppression with an aimer: the barcode needs to touch the aimer before the result is returned to the user (target mode).

In some configurations, there is motion-based delay. A motion detection algorithm determines whether the camera is currently moving or still, based on the similarity of the current frame with respect to the previous one. If the scene is moving, decoding is stopped based on the assumption that the user is moving the device to aim toward the desired barcode. Or that the user is moving the barcode to be in view. When the scene stops moving, barcode reading is resumed after a user configurable time delay, allowing for the scene to settle and for spurious motion detection errors.

In some configurations, frame scoring is used. For example, in a frame a single score is computed by using parameters such as the size of the biggest barcode area decoded and its relationship with the other barcodes decoded, the positions of the barcodes and their relationship with the center of the frame. Once this score is higher than a threshold value the frame is considered as having an intentional scan. This threshold can change in time to become more lax if a result is not given to the user for a long amount of time. In some configurations, if a barcode is continuously decoded by the engine for a certain amount of frames, that barcode is deemed intentional even if the frame score is lower than the threshold value, since a continuous pointing at the same barcode is a strong intentionality indicator by the user.

In some configurations, barcode selection scoring is used. By using the previous parameters computed during the frame scoring process barcodes in the frame can be given a barcode (or optical-pattern) score. For example, the largest barcode in the image and/or the barcode that is closest to the center of the image is given a higher score. The barcode with the highest score is returned to the user. Barcode scoring can be performed in addition to or in lieu of image scoring.

In some configurations, an algorithm can include motion estimation runs on each frame; detecting and/or decoding barcodes starts only after a certain time delay after the scene stops moving; the current frame score is evaluated; if the score higher than threshold or if a barcode is decoded continuously for a certain number of frames the algorithm moves to the next steps (otherwise nothing is returned to the user); barcode selection score is computed for each barcode in the frame, and the one with the highest score is selected and returned to the user; and/or in target mode the selected barcode, if any, is returned only if it touches an aimer.

Figure 9:
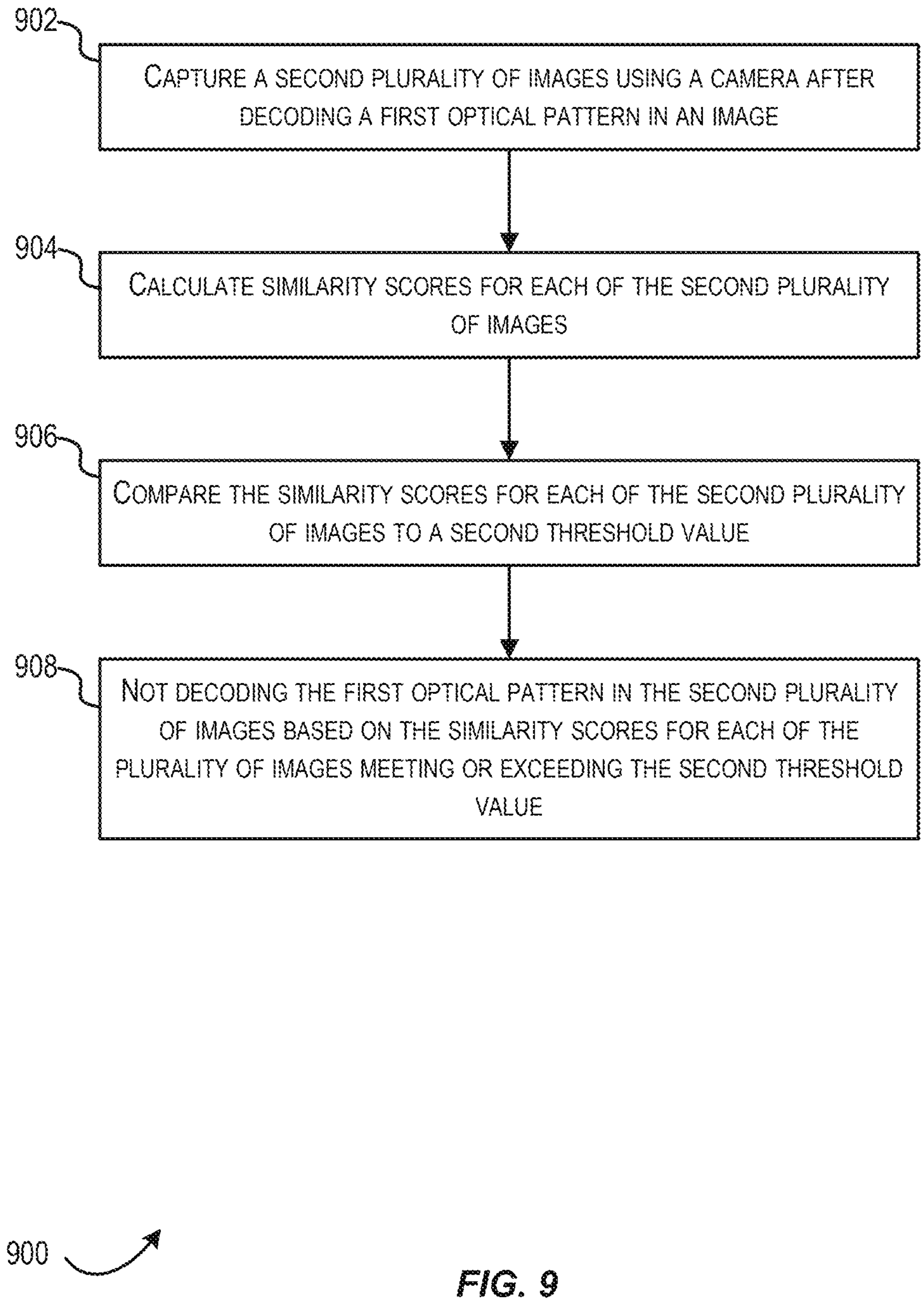
FIG. 9 illustrates an example process for smart barcode filtering, according to some implementations of the present disclosure.

FIG. 9 illustrates an example process 900 for smart barcode filtering. One or more non-transitory computer-readable storage medium may store computer-executable instructions that, when executed by at least one processor, cause at least one computer or system to perform part and/or all of the operations of the process 900. The operations of process 900 may be performed by any suitable portion of the user devices as disclosed in FIGS. 1-4 which may include one or more computing devices such as computing device 1000 of FIG. 10. The operations of process 900 may be performed at one or more suitable blocks of process 800.

At block 902, the process may capture a second plurality of images using the camera after decoding a first optical pattern in an image. The second plurality of images may include the first image.

At block 904, the process may calculate similarity scores for each of the second plurality of images. The similarity scores may be calculated using previously discussed techniques as discussed in more detail with respect to FIG. 3).

At block 906, the process may compare the similarity of scores for each of the second plurality of images to a second threshold value. In some embodiments, the second threshold value may be the same as the first threshold value. The first threshold value, as similarly discussed in FIG. 8, may fluctuate over time similar to the second threshold value.

At block 908, the process may not decode the first optical pattern in the second plurality of images based on the similarity scores for each of the plurality of images meeting or exceeding the second threshold values. In some examples, the first optical pattern may be tracked in the second plurality of images (as discussed in more detail with respect to FIG. 4). The second plurality of images may be presented on the display with the graphical overlay without decoding the first optical pattern or other optical patterns in the second plurality of images.

In some configurations, optical pattern detection and/or decoding resumes (e.g., another plurality of images are acquired with different optical pattern(s)) after motion of the camera is detected (e.g., from comparing images and/or from sensors in a mobile device) and/or after a user input (e.g., after a user tap on the display is detected).

In some configurations, duplicate filtering logic is used to determine whether a user a consistently aiming at the same instance of the optical pattern. If another optical pattern is identified as an intended optical pattern, or if there is movement detected (within a threshold), the first optical pattern will be reported again.

In some configurations, after an intended barcode is decoded, its location is tracked in subsequent frames. Successive intentional reads within its tracked position are filtered out or ignored until the barcode exits the field of view (FOV) or tracking fails. Successive intentional reads can refer to some or all barcodes detected in subsequent image frames (e.g., and/or classified as intentional). In some configurations, tracking can be a preferred mechanism, and if tracking fails, motion detection (e.g., by comparing frames) can be used as a fallback. For example, reads with the same content and/or symbology are suppressed (e.g., filtered) until the system detects that the device moved and then stopped on a new FOV. This can be achieved by waiting for a sequence of frames indicating motion, followed by frames indicating no motion.

In some configurations: 1. A system comprising:

a camera;

one or more processors; and one or more computer readable storage media storing instructions that, when executed by the one or more processors, cause the one or more processors to perform operations comprising:

capturing, using the camera, a plurality of first images of a real scene comprising a plurality of optical patterns;

decoding one or more first optical patterns of the plurality of optical patterns;

processing the one or more first optical patterns to ascertain an intended optical pattern from among the one or more first optical patterns;

capturing, using the camera, a plurality of second images of the real scene;

decoding one or more second optical patterns of the plurality of optical patterns;

processing the one or more second optical patterns to confirm the intended optical pattern; and after confirming the intended optical pattern, displaying, on a display, an image depicting the intended optical pattern and a frame surrounding the intended optical pattern.

2. The system of claim 1, the operations further comprising:

calculating a similarity score between a first image of the plurality of first images and a second image of the plurality of second images;

ascertaining that the camera has moved based at least in part on the similarity score; and ascertaining whether to perform of the decoding of the one or more first optical patterns of the plurality of optical patterns, the decoding of the of the one or more second optical patterns, or a combination thereof.

3. The system of claim 1, wherein processing the one or more first optical patterns to ascertain the intended optical pattern from among the one or more first optical patterns comprises:

ascertaining a parameter associated with the one or more first optical patterns;

ascertaining an image score based at least in part on the parameter; and performing a comparison of the image score to a threshold value, wherein confirming the intended optical pattern is based at least in part on the image score being greater than the threshold value.

4. The system of claim 3, wherein processing the one or more first optical patterns to ascertain the intended optical pattern from among the one or more first optical patterns comprises:

ascertaining whether a first image score of a first image the plurality of first images is greater than a second image score of a second image the plurality of first images, wherein:

i) if the first image score is greater than the second image score, display, on the display, the first image, the first image including the intended optical pattern, or ii) if the first image score is less than the second image score, display, on the display, the second image, the second image including the intended optical pattern.

5. The system of claim 1, wherein processing the one or more second optical patterns to confirm the intended optical pattern further comprises:

ascertaining that the one or more second optical patterns have been previously decoded; and preventing successive decoding of the one or more second optical patterns until a movement is detected based at least in part on the plurality of first images or the plurality of second images.

6. The system of claim 1, wherein processing the one or more second optical patterns to confirm the intended optical pattern further comprises:

ascertaining a position of the one or more second optical patterns;

ascertaining that a movement has occurred relative to the position based at least in part on one or more additional images captured by the camera;

ascertaining that the movement has stopped based at least in part on the one or more additional images; and decoding one or more additional optical patterns based at least in part on the ascertaining that the movement as stopped.

7. The system of claim 1, wherein processing the one or more second optical patterns to confirm the intended optical pattern further comprises:

ascertaining that one or more of the second optical patterns has been decoded for two or more images of the plurality of second images; and confirming the intended optical pattern based at least in part on the two or more images.

8. A method comprising:

capturing, using a camera, a plurality of first images of a real scene comprising a plurality of optical patterns;

decoding one or more first optical patterns of the plurality of optical patterns;

processing the one or more first optical patterns to ascertain an intended optical pattern from among the one or more first optical patterns;

capturing, using the camera, a plurality of second images of the real scene;

decoding one or more second optical patterns of the plurality of optical patterns;

processing the one or more second optical patterns to confirm the intended optical pattern; and after confirming the intended optical pattern, displaying, on a display, an image depicting the intended optical pattern and a frame surrounding the intended optical pattern.

9. The method of claim 8, wherein processing the one or more second optical patterns to confirm the intended optical pattern further comprises:

ascertaining one or more image scores associated with the one or more second optical patterns;

comparing the one or more image scores to a threshold value during a time interval;

in response to the time interval exceeding a time threshold, adjusting the threshold value to an adjusted threshold value;

comparing the one or more image scores to the adjusted threshold value; and confirming the intended optical pattern based at least in part on the comparison of the one or more image scores to the adjusted threshold value.

10. The method of claim 8, wherein the camera has a field of view (FOV), the method further comprising:

displaying, on the display, an aiming indicator overlaying at least a portion of the FOV of the camera; and ascertaining that the one or more first optical patterns or the one or more second optical patterns in the FOV are within a threshold distance of the aiming indicator, and wherein processing the one or more second optical patterns to confirm the intended optical pattern further comprises:

confirming the intended optical pattern based at least in part on the one or more first optical patterns or the one or more second optical patterns in the FOV being within the threshold distance.

11. The method of claim 8, further comprising:

ascertaining a location of a first optical pattern of the one or more first optical patterns or the one or more second optical patterns across at least two images of the first plurality of images or the second plurality of images, and wherein decoding the one or more first optical patterns or the one or more second optical patterns further comprises:

decoding the one or more first optical patterns or the one or more second optical patterns based at least in part on the location of the first optical pattern.

12. The method of claim 8, further comprising:

ascertaining that the one or more first optical patterns is within a field of view (FOV) of the camera; and ascertaining a location of the one or more first optical patterns is approaching a distance threshold of the FOV based at least in part on the plurality of first images, and wherein processing the one or more second optical patterns to confirm the intended optical pattern further comprises:

confirming the intended optical pattern based at least in part on the one or more first optical patterns being within the distance threshold of the FOV.

13. The method of claim 8, further comprising:

receiving an input associated with a time delay, wherein the decoding of the one or more first optical patterns or the one or more second optical patterns occurs after the time delay has elapsed.

14. The method of claim 8, further comprising:

ascertaining that a movement of the camera has occurred during the decoding of the one or more first optical patterns;

pausing the decoding of the one or more first optical patterns until the movement is determined to have stopped; and resuming the decoding of the one or more first optical patterns based at least in part the movement being determined to have stopped.

15. A non-transitory computer-readable media having instructions that, when executed by a processor, cause the processor to:

control a camera to capture a plurality of first images of a real scene comprising a plurality of optical patterns;

decode one or more first optical patterns of the plurality of optical patterns;

process the one or more first optical patterns to ascertain an intended optical pattern from among the one or more first optical patterns;

control the camera to capture a plurality of second images of the real scene;

decode one or more second optical patterns of the plurality of optical patterns;

process the one or more second optical patterns to confirm the intended optical pattern; and after confirming the intended optical pattern, control a display to display an image depicting the intended optical pattern and a frame surrounding the intended optical pattern.

16. The non-transitory computer-readable media of claim 15, wherein the instructions further cause the processor to:

ascertain that no movement of the camera has occurred between two or more images of the plurality of first images;

ascertain that all of the one or more first optical patterns have been decoded; and cease decoding additional optical patterns until a movement of the camera is detected.

17. The non-transitory computer-readable media of claim 15, wherein the instructions further cause the processor to:

ascertain a location of a first optical pattern of the one or more first optical patterns;

ascertain a direction of movement of the camera based at least in part on the location of the first optical pattern; and ascertain the intended optical pattern based at least in part on the direction of movement of the camera.

18. The non-transitory computer-readable media of claim 15, wherein each optical pattern of the one or more first optical patterns is decoded only once until a movement within a movement threshold of the camera is detected.

19. The non-transitory computer-readable media of claim 15, wherein decoding the one or more first optical patterns occurs only once per optical pattern per image of the plurality of first images.

20. The non-transitory computer-readable media of claim 15, wherein the decoding the one or more first optical patterns of the plurality of optical patterns occurs when the one or more first optical patterns are detected across a threshold number of images of the plurality of first images, and displaying the image depicting the intended optical pattern is based at least in part on the one or more first optical patterns being detected across the threshold number of images.

Illustrative Device

Figure 10:
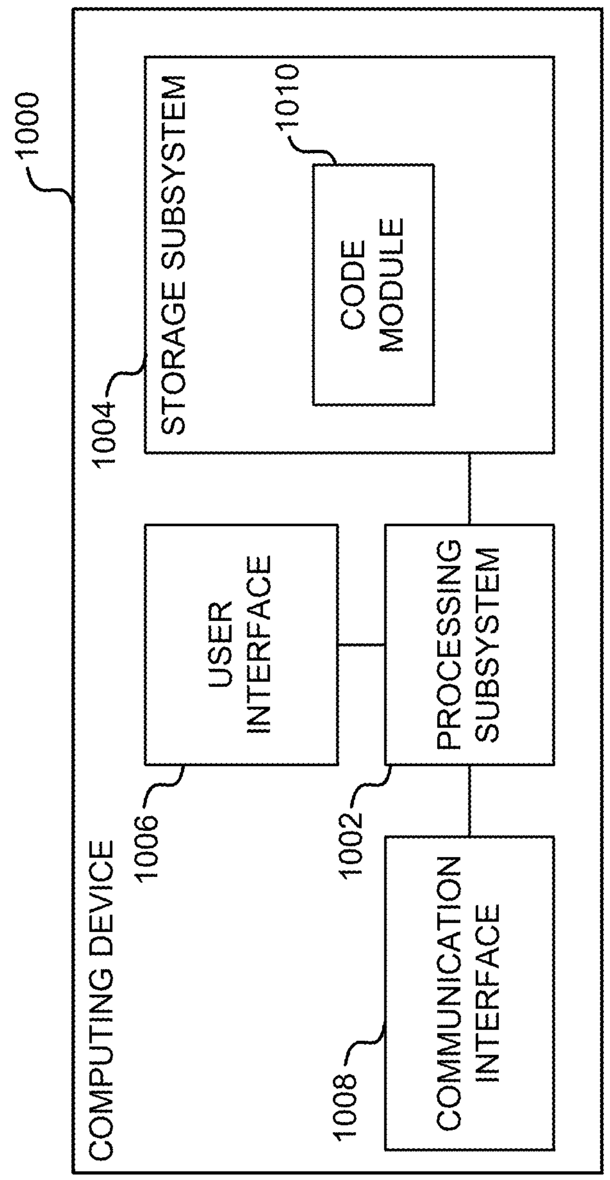
FIG. 10 illustrates a simplified block diagram for an example computing device, according to some implementations of the present disclosure.

FIG. 10 illustrates a simplified block diagram for an example computing device 1000, according to some implementations of the present disclosure. Computing device 1000 may be included in some or all user devices of in FIGS. 1-4 (e.g., user device 202, etc.) can implement some or all functions, behaviors, and/or capabilities described above that would use electronic storage or processing, as well as other functions, behaviors, or capabilities not expressly described. Computing device 1000 includes a processing subsystem 1002, a storage subsystem 1004, a user interface 1006, and/or a communication interface 1008. Computing device 1000 can also include other components (not explicitly shown) such as a battery, power controllers, and other components operable to provide various enhanced capabilities. In various embodiments, computing device 1000 can be implemented in a desktop or laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 1004 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 1004 can store one or more applications and/or operating system programs to be executed by processing subsystem 1002, including programs to implement some or all operations described above that would be performed using a computer. For example, storage subsystem 1004 can store one or more code modules 1009 for implementing one or more method steps described above.

A firmware and/or software implementation may be implemented with modules (e.g., procedures, functions, and so on). A machine-readable medium tangibly embodying instructions may be used in implementing methodologies described herein. Code modules 1009 (e.g., instructions stored in memory) may be implemented within a processor or external to the processor. As used herein, the term “memory” refers to a type of long term, short term, volatile, nonvolatile, or other storage medium and is not to be limited to any particular type of memory or number of memories or type of media upon which memory is stored.

Moreover, the term “storage medium” or “storage device” may represent one or more memories for storing data, including read only memory (ROM), RAM, magnetic RAM, core memory, magnetic disk storage mediums, optical storage mediums, flash memory devices and/or other machine readable mediums for storing information. The term “machine-readable medium” includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module 1009) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 1010 may comprise sets of instructions (codes) embodied on a computer-readable medium that directs a processor of a computing device 1000 to perform corresponding actions. The instructions may be configured to run in sequential order, in parallel (such as under different processing threads), or in a combination thereof. After loading a code module 1009 on a general-purpose computer system, the general purpose computer is transformed into a special purpose computer system.

Computer programs incorporating various features described herein (e.g., in one or more code modules 1010) may be encoded and stored on various computer readable storage media. Computer readable media encoded with the program code may be packaged with a compatible electronic device, or the program code may be provided separately from electronic devices (e.g., via Internet download or as a separately packaged computer-readable storage medium). Storage subsystem 1004 can also store information useful for establishing network connections using the communication interface 1008.

User interface 1006 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital-to-analog or analog-to-digital converters, signal processors, etc.). A user can operate input devices of user interface 1006 to invoke the functionality of computing device 1000 and can view and/or hear output from computing device 1000 via output devices of user interface 1006. For some embodiments, the user interface 1006 might not be present (e.g., for a process using an ASIC).

Processing subsystem 1002 can be implemented as one or more processors (e.g., integrated circuits, one or more single-core or multi-core microprocessors, microcontrollers, central processing unit, graphics processing unit, etc.). In operation, processing subsystem 1002 can control the operation of computing device 1000. In some embodiments, processing subsystem 1002 can execute a variety of programs in response to program code and can maintain multiple concurrently executing programs or processes. At a given time, some or all of a program code to be executed can reside in processing subsystem 1002 and/or in storage media, such as storage subsystem 1004. Through programming, processing subsystem 1002 can provide various functionality for computing device 1000. Processing subsystem 1002 can also execute other programs to control other functions of computing device 1000, including programs that may be stored in storage subsystem 1004.

Communication interface 1008 can provide voice and/or data communication capability for computing device 1000. In some embodiments, communication interface 1008 can include radio frequency (RF) transceiver components for accessing wireless data networks (e.g., Wi-Fi network; 3G, 4G/LTE; etc.), mobile communication technologies, components for short-range wireless communication (e.g., using Bluetooth communication standards, NFC, etc.), other components, or combinations of technologies. In some embodiments, communication interface 1008 can provide wired connectivity (e.g., universal serial bus, Ethernet, universal asynchronous receiver/transmitter, etc.) in addition to, or in lieu of, a wireless interface. Communication interface 1008 can be implemented using a combination of hardware (e.g., driver circuits, antennas, modulators/demodulators, encoders/decoders, and other analog and/or digital signal processing circuits) and software components. In some embodiments, communication interface 1008 can support multiple communication channels concurrently. In some embodiments the communication interface 1008 is not used.

It will be appreciated that computing device 1000 is illustrative and that variations and modifications are possible. A computing device can have various functionality not specifically described (e.g., voice communication via cellular telephone networks) and can include components appropriate to such functionality.

Further, while the computing device 1000 is described with reference to particular blocks, it is to be understood that these blocks are defined for convenience of description and are not intended to imply a particular physical arrangement of component parts. For example, the processing subsystem 1002, the storage subsystem, the user interface 1006, and/or the communication interface 1008 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments can be realized in a variety of apparatus including electronic devices implemented using a combination of circuitry and software. Electronic devices described herein can be implemented using computing device 1000.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments can be realized in a variety of apparatus including electronic devices implemented using a combination of circuitry and software. Electronic devices described herein can be implemented using computing device 1000.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors)

to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain principles and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

What is claimed is:

1. A system comprising:

a camera;

a display;

one or more processors; and one or more computer readable storage media storing instructions that, when executed by the one or more processors, cause the one or more processors to perform operations comprising:

capturing, using the camera, a plurality of images of a real scene comprising a plurality of optical patterns, wherein the plurality of optical patterns comprises a first optical pattern and a second optical pattern;

calculating a similarity score for each of the plurality of images;

comparing similarity scores for each of the plurality of images to a threshold value;

selecting a first image, from the plurality of images, based on the first image having a similarity score that meets or exceeds the threshold value;

detecting the first optical pattern and the second optical pattern in the first image;

calculating an optical-pattern score for the first optical pattern in the first image;

decoding the first optical pattern, after detecting the first optical pattern and the second optical pattern in the first image, based on the optical-pattern score and without decoding the second optical pattern, so that the first optical pattern is the only pattern of the plurality of optical patterns decoded in the first image; and presenting, after decoding the first optical pattern, on the display a second image and a graphical overlay on the second image that indicates that the first optical pattern was decoded.

2. The system of claim 1, wherein:

the plurality of images is a first plurality of images;

the threshold value is a first threshold value; and the operations further comprise:

capturing a second plurality of images using the camera, after decoding the first optical pattern in the first image, wherein the second plurality of images comprise the first optical pattern;

tracking the first optical pattern in the second plurality of images;

presenting the second plurality of images on the display with the graphical overlay, without decoding the first optical pattern in the second plurality of images, based on tracking the first optical pattern in the second plurality of images;

calculating similarity scores for each of the second plurality of images;

comparing the similarity scores for each of the second plurality of images to a second threshold value; and not decoding the first optical pattern in the second plurality of images based on similarity scores for each of the plurality of images meeting or exceeding the second threshold value.

3. The system of claim 1, wherein the optical-pattern score is based on a size of the first optical pattern in the first image or on a distance from a configurable point of the first image.

4. The system of claim 1, wherein:

the threshold value is a first threshold value; and the operations further comprise:

identifying a subset of images of the plurality of images having similarity scores that meet or exceed the first threshold value;

calculating image scores for each image of the subset of images;

comparing the image scores for each image of the subset of images to a second threshold value; and selecting the first image based on an image score of the first image meeting or exceeding the second threshold value.

5. A method comprising:
capturing, using a camera, a plurality of images of a real scene comprising a plurality of optical patterns, wherein the plurality of optical patterns comprises a first optical pattern and a second optical pattern;
calculating a similarity score for each of the plurality of images;
comparing similarity scores for each of the plurality of images to a threshold value;
selecting a first image, from the plurality of images, based on the first image having a similarity score that meets or exceeds the threshold value;
detecting the first optical pattern and the second optical pattern in the first image;
calculating an optical-pattern score for the first optical pattern in the first image;
decoding the first optical pattern, after detecting the first optical pattern and the second optical pattern in the first image, based on the optical-pattern score and without decoding the second optical pattern; and
presenting, after decoding the first optical pattern, on a display a second image and a graphical overlay on the second image to indicate that indicates that the first optical pattern was decoded.

6. The method of claim 5, wherein:
the plurality of images is a first plurality of images;
the threshold value is a first threshold value; and
the method further comprises:
capturing a second plurality of images using the camera, after decoding the first optical pattern in the first image, wherein the second plurality of images comprise the first optical pattern;
calculating similarity scores for each of the second plurality of images;
comparing the similarity scores for each of the second plurality of images to a second threshold value; and
not decoding the first optical pattern in the second plurality of images based on the similarity scores for each of the plurality of images meeting or exceeding the second threshold value.

7. The method of claim 6, wherein the second threshold value is the same as the first threshold value.

8. The method of claim 6, the method further comprising:
tracking the first optical pattern in the second plurality of images; and
presenting the second plurality of images on the display with the graphical overlay, without decoding the first optical pattern or other optical patterns in the second plurality of images.

9. The method of claim 5, wherein:
the plurality of images is a first plurality of images; and
the method further comprises:
capturing a second plurality of images using the camera, after decoding the first optical pattern in the first image, wherein the second plurality of images comprise the first optical pattern;
tracking the first optical pattern in the second plurality of images; and
presenting the second plurality of images on the display with the graphical overlay, without decoding the first optical pattern in the second plurality of images, based on tracking the first optical pattern in the second plurality of images.

10. The method of claim 5, wherein the optical-pattern score is based on a size of the first optical pattern in the first image.

11. The method of claim 5, wherein the optical-pattern score is based on a distance from a configurable point of the first image.

12. The method of claim 11, the method further comprising:
calculating an optical-pattern score for the second optical pattern, based on how far the second optical pattern is from the configurable point of the first image;
comparing the optical-pattern score of the first optical pattern to the optical-pattern score of the second optical pattern;
ascertaining that the first optical pattern is closer to the configurable point of the first image than the second optical pattern based on comparing the optical-pattern score of the first optical pattern to the optical-pattern score of the second optical pattern; and
decoding the first optical pattern and not the second optical pattern in the first image based on the first optical pattern being closer to the configurable point of the first image than the second optical pattern.

13. The method of claim 5, wherein:
the threshold value is a first threshold value; and
the method further comprises:
identifying a subset of images of the plurality of images having similarity scores that meet or exceed the first threshold value;
calculating image scores for each image of the subset of images;
comparing the image scores for each image of the subset of images to a second threshold value; and
selecting the first image based on an image score of the first image meeting or exceeding the second threshold value.

14. The method of claim 13, wherein the second threshold value drops as more time passes without identifying an image of the subset of images having an image score that exceeds the second threshold value.

15. The method of claim 13, wherein image score is based on how far an optical pattern of the plurality of optical patterns is from a center of an image, with a higher value for at least one optical pattern being closer to the center of the image.

16. The method of claim 5, wherein the first optical pattern is in a group of optical patterns that are decoded.

17. The method of claim 5, wherein:
the plurality of optical patterns comprises three or more optical patterns that are detected in the first image; and
the first optical pattern is the only pattern of the plurality of optical patterns decoded in the first image.

18. A memory device comprising instructions that, when one or more computer readable storage media storing instructions that, when executed by one or more processors, cause the one or more processors to perform operations comprising:
capturing, using a camera, a plurality of images of a real scene comprising a plurality of optical patterns, wherein the plurality of optical patterns comprises a first optical pattern and a second optical pattern;
calculating a similarity score for each of the plurality of images;
comparing similarity scores for each of the plurality of images to a threshold value;

selecting a first image, from the plurality of images, based on the first image having a similarity score that meets or exceeds the threshold value;

detecting the first optical pattern and the second optical pattern in the first image;

calculating an optical-pattern score for the first optical pattern in the first image;

decoding the first optical pattern, after detecting the first optical pattern and the second optical pattern in the first image, based on the optical-pattern score and without decoding the second optical pattern; and presenting, after decoding the first optical pattern, on a display a second image and a graphical overlay on the second image that indicates that the first optical pattern was decoded.

19. The memory device of claim 18, wherein the optical-pattern score is based on a distance from a configurable point of the first image.

20. The memory device of claim 18, wherein:

the plurality of images is a first plurality of images;

the threshold value is a first threshold value; and the operations further comprises:

capturing a second plurality of images using the camera, after decoding the first optical pattern in the first image, wherein the second plurality of images comprise the first optical pattern;

calculating similarity scores for each of the second plurality of images;

comparing the similarity scores for each of the second plurality of images to a second threshold value; and not decoding the first optical pattern in the second plurality of images based on the similarity scores for each of the plurality of images meeting or exceeding the second threshold value.

* * * * *